(12) United States Patent
Kenny

(10) Patent No.: US 7,359,116 B2
(45) Date of Patent: Apr. 15, 2008

(54) MICROSCOPE TURRET MOUNTED LASER EPI-ILLUMINATION PORT

(75) Inventor: Thomas G. Kenny, Ipswich, MA (US)

(73) Assignee: Hamilton Thorne Biosciences, Inc., Beverly, MA (US)

( * ) Notice: Subject to any disclaimer, the term of this patent is extended or adjusted under 35 U.S.C. 154(b) by 47 days.

(21) Appl. No.: 10/271,706

(22) Filed: Oct. 15, 2002

(65) Prior Publication Data

US 2003/0090792 A1    May 15, 2003

Related U.S. Application Data

(60) Provisional application No. 60/366,774, filed on Mar. 22, 2002, provisional application No. 60/329,769, filed on Oct. 16, 2001.

(51) Int. Cl.
*G02B 21/06* (2006.01)
*G02B 21/00* (2006.01)

(52) U.S. Cl. ............... 359/385; 359/368; 359/388

(58) Field of Classification Search ......... 359/368–390
See application file for complete search history.

(56) References Cited

U.S. PATENT DOCUMENTS

| | | | |
|---|---|---|---|
| 4,617,467 A | 10/1986 | Senftle et al. | 250/461.1 |
| 4,884,880 A | 12/1989 | Lichtman et al. | 359/368 |
| 4,904,085 A | 2/1990 | Spillman Jr. et al. | 356/364 |
| 5,349,468 A | 9/1994 | Rathbone et al. | 359/390 |
| 5,610,712 A * | 3/1997 | Schmitz et al. | 356/335 |
| 5,754,289 A | 5/1998 | Ozaki et al. | 356/301 |
| 5,759,781 A * | 6/1998 | Ward et al. | 435/6 |
| 5,972,667 A | 10/1999 | Conia et al. | 435/173.2 |
| 6,052,223 A * | 4/2000 | Yoneyama et al. | 359/381 |
| 6,251,615 B1 * | 6/2001 | Oberhardt | 435/7.21 |
| 6,313,944 B2 * | 11/2001 | Kawahito | 359/388 |

OTHER PUBLICATIONS

Berns, M.W. et al. "Laser scissors and tweezers." *Methods Cell Biol.* 1998;55:71-98.
Cohen, J. et al. "Implantation enhancement by selective assisted hatching using zona drilling of human embryos with poor prognosis." *Hum. Reprod.* May 1992;7(5):685-91.
Douglas-Hamilton, D.H. et al. "Thermal effects in laser-assisted pre-embryo zona drilling." *J. Biomed. Optics* Apr. 2001;6(2):205-213.

(Continued)

*Primary Examiner*—Thong Q. Nguyen
(74) *Attorney, Agent, or Firm*—Stroock & Stroock & Lavan LLP

(57) ABSTRACT

An optical injection system for use in conjunction with a microscope having a turret supporting an objective having an optical path is provided. The optical injection system includes a dichroic mirror disposed between the turret and the objective, along the optical path. A collimating lens is further provided having an optical path directed to intersect the dichroic mirror. A laser source is positioned to project a laser beam through the collimating lens and along the collimating lens optical path. The laser can be used in conjunction with the microscope for a number of microsurgery applications. A method for calculating and displaying the isothermal contours of the energy produced by a laser in a sample is also provided.

22 Claims, 20 Drawing Sheets

OTHER PUBLICATIONS

Germond, M. et al. "Microdissection of mouse and human zona pellucida using a 1.48μm diod laser beam: efficiency and safety of the procedure." *Fertility and Sterility* Sep. 1995;64(3):604-611.

Montag, M. et al. "Laser-assisted microdissection of the zona pellucida facilitates polar body biopsy." *Fertility and Sterility* Mar. 1998;69(3):539-542.

Petit, C. et al. "Use of PRINS for preconception screening of polar bodies for common aneuploidies." *Prenatal Diagnosis* 2000;20:1067-1071.

Strom, C.M. et al. "Neonatal outcome of preimplantation genetic diagnosis by polar body removal: the first 109 infants." *Pediatrics* Oct. 2000;106(4):650-3.

Veiga, A. et al. "Laser blastocyst biopsy for preimplantation diagnosis in the human." *Zygote* Nov. 1997;5(4):351-4.

Viville, S. et al. "Human embryo research in France." *Hum. Reprod.* Feb. 2002;17(2):261-3.

Cell Robotics International, Inc. "CRI Workstation. LaserScissors Workstation" pp. 1-2, retrieved from Internet on Oct. 9, 2001 http:www.cellrobotics.com/workstation/lsws.html.

Cell Robotics International, Inc. "CRI Workstation. LaserTweezers Workstation" p. 1, retrieved from Internet on Oct. 9, 2001 http://www.cellrobotics.com/workstation/ltws.html.

* cited by examiner

3 Bovine oocytes
2 Mouse Embryos

MICROSCOPE TURRET MOUNTED LASER EPI-ILLUMINATION PORT

RELATED APPLICATION

This application claims priority to co-pending U.S. Provisional Application No. 60/329,769, filed on Oct. 16, 2001, and co-pending U.S. Provisional Application No. 60/366,774, filed on Mar. 22, 2002, incorporated herein in their entirety by this reference.

FIELD OF THE INVENTION

The present invention relates to an adaptation of a laser to a microscope. More specifically, a device is disclosed that fits between the microscope objective and the microscope nosepiece turret for introducing laser energy into the optical path and on to the microscope sample.

The present invention also relates to a method for calculating and displaying the isothermal contours produced by a laser in a sample. The method can be carried out using the described microscope and a computing apparatus for performing the calculations and displaying the isothermal contours.

BACKGROUND OF THE INVENTION

Recent advances in biology and medicine have led to the development of laser beam microsurgery on cells. The laser beam is well adapted to micro-manipulation of small objects, such as single cells or organelles. It provides the advantage of non-contact ablation, volatilization, sterilization and denaturing, cutting, and other forms of thermal and actinic-light treatment. The four parameters of focal spot size, laser wavelength, pulse duration, and laser power, provide a variety of regimes suitable for different applications. One example use of laser beam microsurgery is the application of laser beams to the treatment of the mammalian oocyte and embryo. However, laser beam microsurgery in a number of inverted or upright microscopes can be utilized for many different surgical or medical applications.

In further detail of the example application, the early-stage mammalian embryo is contained within a protective layer, the zona pellucida ("ZP"). The ZP is relatively analogous to the shell of a hen's egg. This proteinaceous ZP layer is of varying thickness, typically 10 to 20 µm, and of varying hardness. The embryo remains within the ZP during development from the single-cell to the blastocyst stage, at which point the embryo breaks out of the ZP and implants itself into the uterine wall.

It has been found that certain embryos, typically those from older mothers or embryos that have been frozen for storage, frequently have much tougher ZP layers than younger-origin or untreated embryos. Consequently, when the time comes for the embryo to emerge from the ZP, there may be a significant impediment in the tougher layers, which have to be traversed. If the embryo fails to hatch in the limited time available, it will be lost and fertility will fail.

Assisted hatching derives from the observation that fertility can be augmented by generating holes or gaps in the ZP through which the embryo can more easily emerge. This has been done using mechanical or ultrasonic cutting, chemical erosion (acidified Tyrodes solution), or by laser ablation of part of the ZP.

A laser can be used to produce a trench in the edge of the ZP layer, penetrating through (or almost through) the ZP thickness. The trench creates a weakened region that provides a crack through which the embryo will later emerge. Lasers of many types can ablate the ZP. A laser of wavelength $\lambda=1480$ nm, which is strongly absorbed in water, has been found to be effective for thermolysing the ZP. The laser can be used in pulses relatively short enough to avoid significant thermal conduction into the nearby embryo blastomeres, and at the same time avoid a chemical effect on the cellular chemistry, since it is in the non-actinic infrared wavelength region. The ZP is removed out to a radius around the laser beam determined by the local temperature history during the laser pulse.

The same laser system can be used to ablate a larger region of ZP so that an intact blastomere can be removed for external analysis. The laser is used, in this case, in a series of pulses directed at adjacent parts of the ZP to erode away a larger region. Typically, a gap is opened until a pipette can be introduced to suck out a blastomere. The embryo is relatively resilient, and generally survives both hatching and biopsy ZP ablation.

Another related application of the laser system is in direct removal of the polar body for genetic analysis. Removal can be done either at the oocyte stage (first polar body), or after fertilization at the embryo stage (second polar body). Both polar bodies can be used to derive information on the genetic composition of the embryo. The procedure is analogous to laser assisted biopsy, except that in this case only the ZP layer and not the perivitelline membrane is penetrated, since the polar body remains between the perivitelline layer and the ZP. Additional related applications include transfer of part or all of the nucleus (nuclear transfer or transgenetic engineering), and ablation and destruction of part or all of the cell nucleus or oocyte spindle (e.g. in a cell to be used as the recipient of nuclear transfer). All of these applications benefit from the precise ablation capabilities of the laser system.

The above applications are by way of example and should not be construed as limiting the possible uses of the invention. The present invention can be applied in any field where a laser beam is used with a microscope assembly.

SUMMARY OF THE INVENTION

There is a need in the art for a configuration for introducing laser energy to a microscope, wherein the length of the laser beam emitted is reduced, and the quality is improved. There is also a need in the art for a method of calculating and displaying the isothermal contours associated with the energy generated in a sample by a laser. The present invention is directed toward further solutions to address these needs.

An optical injection system for use in conjunction with a microscope having a turret supporting an objective having an optical path is provided. The optical injection system includes a dichroic mirror disposed between the turret and the objective, along the optical path. A collimating lens is further provided having an optical path directed to intersect the dichroic mirror. A laser source is positioned to project a laser beam through the collimating lens and along the collimating lens optical path.

In accordance with further embodiments of the present invention, the laser source includes an internal laser powered from an electronic package. The laser source can further originate using fiber optic cable providing optical energy from a laser. The laser can be one of an internal laser and an external laser, and operate at a wavelength ($\lambda$) of about 1480 nm. The laser beam can also be confocal with an optical image.

The microscope can take the form of an inverted or a non-inverted microscope. The microscope objective can take the form of a shortened optical train to provide a standard total length 45 mm parfocal objective unit module. The system can also be adapted to longer parfocality systems, e.g., the Nikon CFI 60 optics (60 mm parfocality system).

In accordance with another embodiment, the turret has a removable turret adapter. The turret adapter can be one of a plurality of turret adapter designs, thereby creating a universal mounting system, which enables the optical injection system to be mounted to the microscope.

In accordance with further embodiments of the present invention, an electronic package can be disposed separate from the system. Alternatively, the electronic package can be built-in to a board in a computing apparatus. The laser can be mounted on a piston in a cylinder. Focus of the laser in such an arrangement can be provided by a single screw to adjust the distance from the laser to the collimating lens.

In accordance with another embodiment of the present invention, the laser may be located in the electronic package, and the laser energy transferred to the optical injection system through a fiber cable.

The system of the present invention can be utilized in a number of different applications, including ablating, dissecting, moving, holding, or otherwise effecting biological cells or tissue with a laser source.

A method for calculating and displaying the isothermal contours generated by a laser in a sample is also provided. The method includes applying a laser beam to the focal point of a sample, dividing the region near the focal point into cylinders coaxial with the beam, deriving the maximum temperature reached during the laser pulse of at least three points at arbitrary distances from the focal point, plotting the temperatures calculated as a function of distance from the focal point sufficient to generate isothermal contours, and generating a computer display of said isothermal contours corresponding to the temperature calculations.

In accordance with further embodiments of the present invention, the sample is placed in an isotropic medium and the temperature calculations are displayed as rings centered around the focal point. A picture of the sample can also be displayed with the rings.

The method of the present invention can be utilized in conjunction with a number of different applications, including ablating, dissecting, moving, holding, or otherwise effecting biological cells or tissue with a laser source.

BRIEF DESCRIPTION OF THE DRAWINGS

The features and advantages of the present invention will become better understood with regard to the following description and accompanying drawings, wherein.

DETAILED DESCRIPTION

An illustrative embodiment of the present invention relates to a system combining a laser with a microscope to result in an efficient and multi-functional device for performing micromanipulation of small objects with a laser.

FIGS. 2A through 16 illustrate example embodiments of a laser assembly and/or a laser and microscope arrangement, in addition to example applications for use of the laser and microscope arrangement, and results thereof, according to aspects of the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Lasers have been utilized for manipulation of cells and cellular organelles. The application of a precise dose of radiation for a set time in a pre-designated area can be used to destroy or neutralize organelles, such as the nucleus, as well as cutting, trapping and heating entire cells. The present disclosure utilizes an example of using the lasers for drilling into embryo zona pellucida ("ZP"). However, this is merely an illustrative application and in no way is it intended that the present invention be limited to such application.

Adapters and kits used in conjunction with microscopes are shown in two patents described below. U.S. Pat. No. 5,349,468 is directed to an adapter for a microscope that fits between the objective and the microscope turret for providing fluorescence microscopy. In this device a light source provides illumination in a direction normal to the optic axis, which projects the light after collimation onto a dichroic mirror, and then to the objective, to give epifluorescent illumination of the target.

U.S. Pat. No. 4,884,880 is directed to a "kit" that converts the standard microscope into a single aperture confocal scanning epi-illumination microscope. The kit fits between the objective and the microscope for the purpose of creating scanning epi-illumination.

Figure 1A:
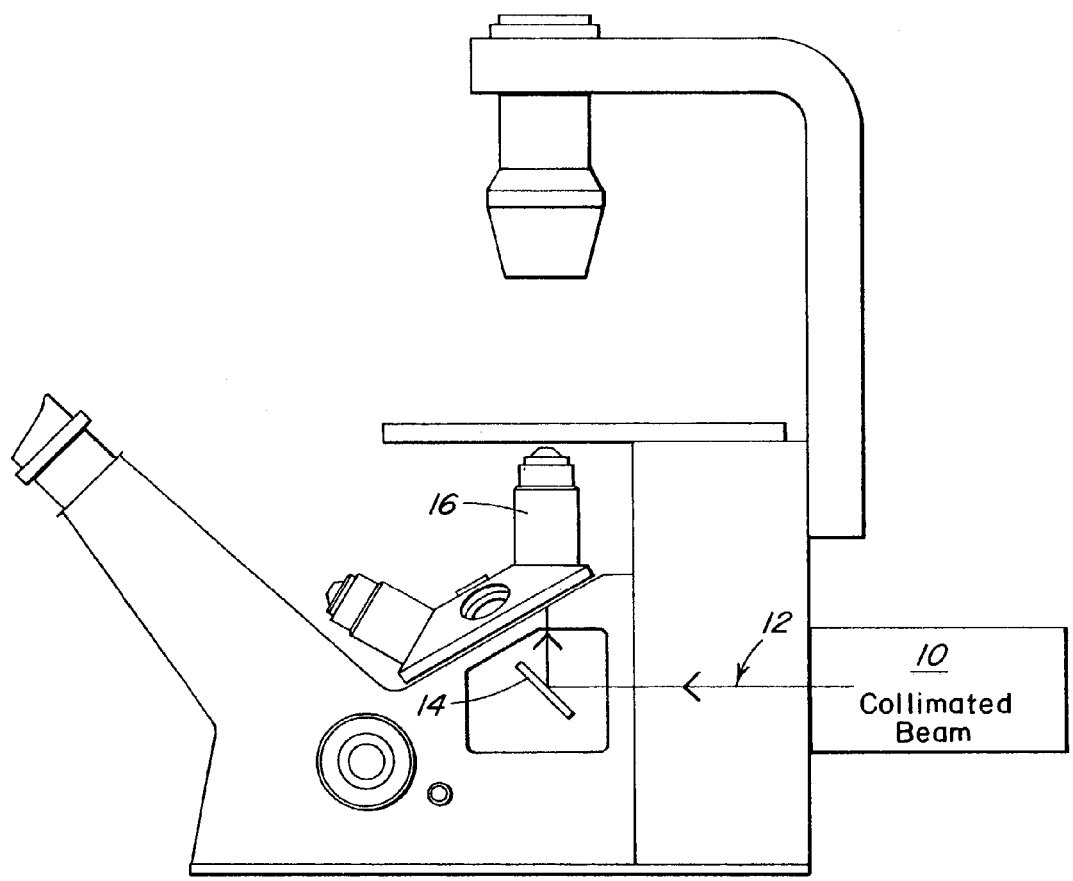
FIG. 1A is a diagrammatic illustration of a conventional fluorescent port laser.

In a conventional fluorescent port microscope arrangement, laser radiation is conveyed from the source to the microscope objective using a collimated beam and an on-axis dichroic mirror (see FIG. 1A). The optical system is analogous to an epifluorescent design, in which laser radiation is used in place of the exciting fluorescent illumination. Chromatic aberration between the laser infrared (IR) beam and visible light is removed by adjusting the degree of collimation of the laser beam, so that it is confocal with the visible image and produces its maximum effect exactly in the same plane as the image. In some conventional devices, long IR pathlengths were used to convey the laser energy between a laser source 10, generally at the back of the microscope, through a fluorescent cavity 12, on to a dichroic mirror 14, and through an objective 16 to the target. The objective 16 must be highly transmissive in both the laser radiation wavelength and the visible wavelength for such an arrangement. The long path length resulted in attenuation of the laser beam and reduced its safety, since prevention of local blastomere heating is more difficult with less powerful beams. A typical arrangement of this type is shown in FIG. 1A.

Figure 1B:
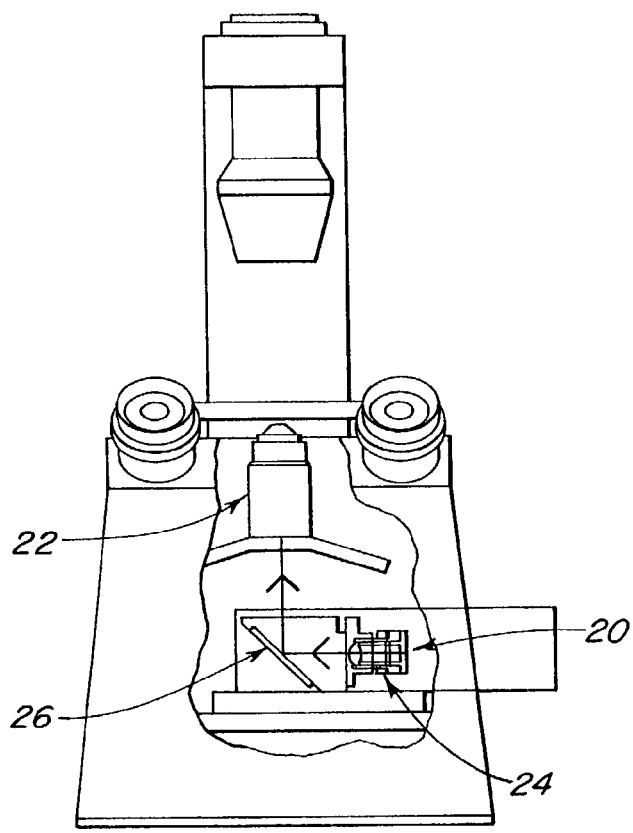
FIG. 1B is a diagrammatic illustration of a conventional filter-cube laser.

More recent conventional designs, as shown in FIG. 1B, minimize the pathlength between a laser source 20 and an objective 22 by packaging an entire optical system 24, including a dichroic mirror 26, into a region under the objective 22. This is the same location where the fluorescent filter-cubes are placed in fluorescent operation. This arrangement increases the laser power available and makes the laser more portable and easily adjustable. However, the arrangement prevents use of fluorescent illumination, or other optical devices needing the same space (e.g. the Spindle-View™ polarizer, made by CRI, Inc. of Woburn, Mass., for detecting the oocyte spindle for ICSI), and the laser package generally must be removed before devices of such type can be utilized.

Figure 1C:
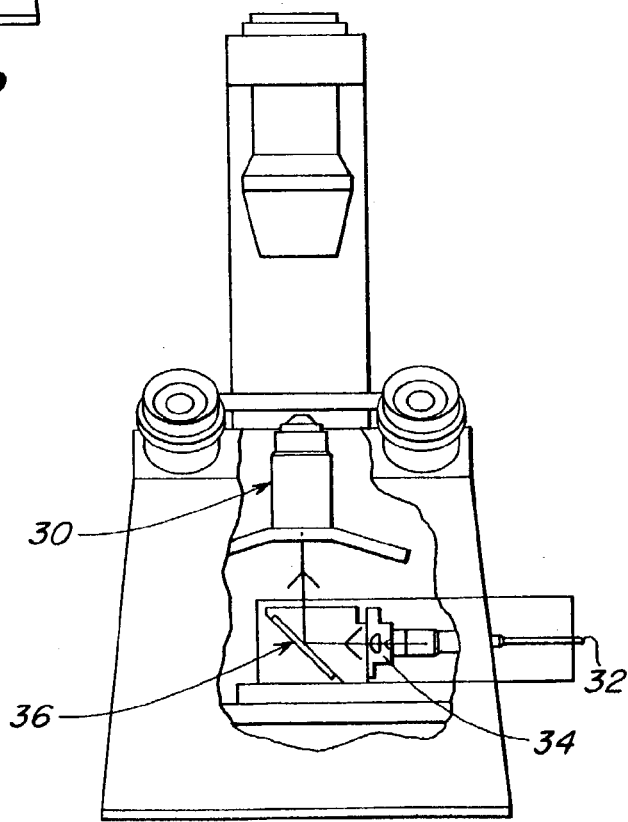
FIG. 1C is a diagrammatic illustration of a conventional filter-cube fiber optic laser.

In certain other conventional designs, the IR radiation is conveyed to an objective 30 using a fiber-optic cable 32 as shown in FIG. 1C. The exit of the fiber-optic cable 32 acts as a laser source, and the beam passes through a collimating lens 34, which may be, for example, an aspheric or a GRIN lens, and reflects from a dichroic mirror 36 to provide the required almost-parallel beam into the objective 30. This arrangement has the advantage of facilitating the positioning of the fiber-optic "source". Moreover, another (e.g. a visible) laser cable can be spliced into the fiber-optic cable 32, giving in effect two coincident sources. However, the transfer of energy into and out of the fiber optic cable inevitably reduces the laser power available, due to focusing, reflective, and cable attenuation losses. The available energy therefore tends to be lower in fiber optic systems, again leading to the use of longer pulses and the associated greater heating of neighboring blastomeres.

One difficulty associated with laser power delivery by fiber optic cables is that, due to the very small diameter of the fiber, the presence of tiny particles or other obscuration at the cable entry or exit can greatly diminish the intensity of the laser beam delivered to the target. While this is a common issue for the conventional digital information transfer application of fiber optic cables, such digital signals can sustain a loss and still transmit information properly. However, it is a greater potential difficulty with energy-transfer applications where the unreliability of the beam intensity at target makes accurate and repeatable ZP hole-drilling problematic.

The disadvantages of the prior methods can be overcome by the teachings of the present invention. In accordance with the present invention, advantage is taken of the fact that a laser source is packaged in a small integrated-circuit "can" 66 shown in FIG. 2B, and is sufficiently small that it may be positioned very close to an objective 54. In one embodiment of the present invention, a laser assembly 76 including a specially designed low-profile objective (e.g. a short 21 mm objective) is combined with an optical injection system 56 to introduce the laser light between a microscope turret 58 and the objective 54. The turret 58 (see FIG. 2A) includes a removable turret adapter 59. The turret adapter 59 is one of a number of different turret adapter designs. The plurality of turret adapter designs creates a universal mounting system, which enables the laser assembly 76 to be mounted to any microscope.

Figure 2A:
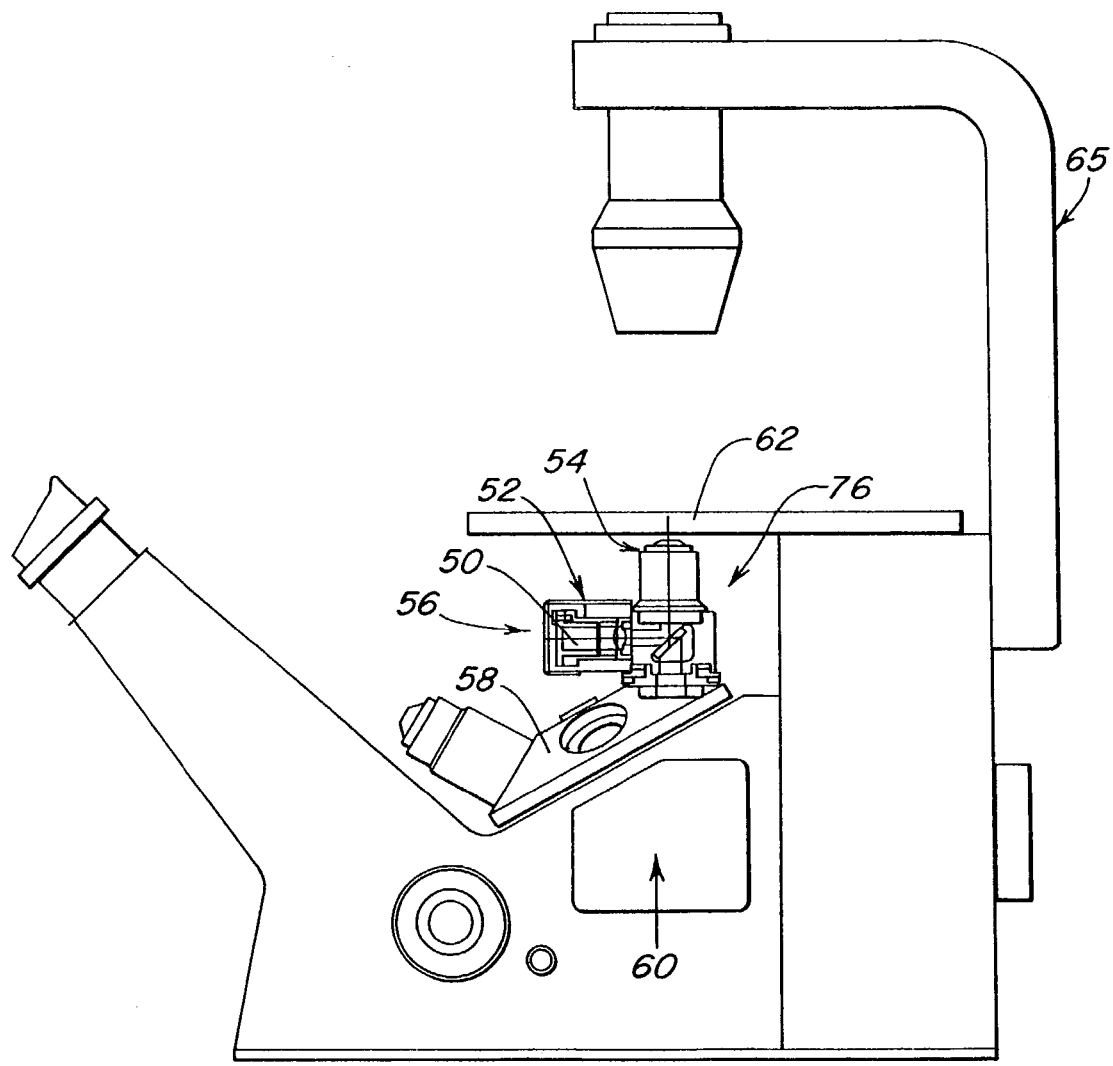
FIG. 2A is a side view illustration of a laser and microscope arrangement according to one aspect of the present invention.

In this design, a fluorescent filter-cube channel 60 (see FIG. 2A) beneath the inverted microscope turret 58 is left unoccupied, and may be filled with any optical equipment required, since it is no longer integral to the optical design of the laser system. The entire laser assembly 76 exists between the microscope turret 58 and a microscope stage 62 as shown in FIG. 2A. The position of the laser assembly 76 between turret 58 and stage 62 is indicated.

Figure 2B:
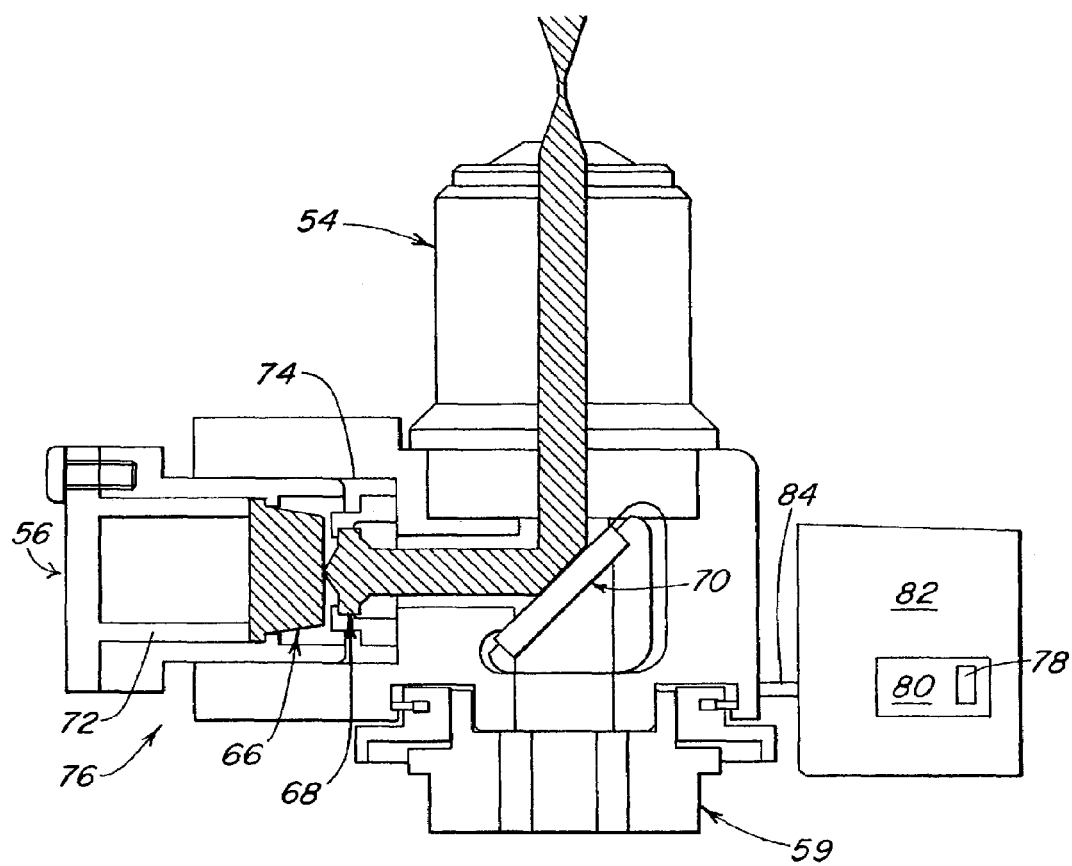
FIG. 2B is a side view illustration of the arrangement of FIG. 2A in further detail according to one aspect of the present invention.

The optical injection system 56 is shown in additional detail in FIG. 2B. A solid-state laser beam is directed through an adjustable collimating lens 68 on to a dichroic mirror 70. The dichroic mirror 70 reflects the wavelength $\lambda=1480$ nm radiation beam along the optic axis and up into the objective 54, in a direction opposite to the image beam light. A laser diode 66 is mounted inside a piston 72 of precise dimensions, which slides in a cylinder 74. The sliding movement of the piston 72 controls the distance of the laser diode 66 to the collimating lens 68, while preventing lateral movement. Any chromatic aberration between the laser beam and the visible image is removed by adjusting the piston 72 position. The movement of the piston 72 focuses the laser beam.

The laser diode 66, piston 72, collimating lens 68 and dichroic mirror 70 are packaged in optical injection system 56. The objective 54 screws in to the top of the optical injection system 56, creating the laser assembly 76, which can be coupled to the turret 58 by way of the turret adapter 59. The entire laser assembly 76 is constructed so that it can be mounted like an objective, by first screwing the turret adapter 59 on to the objective nosepiece turret 58 and then screwing the laser assembly 76 on to the turret adapter 59. The design of the laser assembly 76 to turret adapter 59 interface is such that the laser assembly 76 may be oriented in any rotational position and then locked down into place. This feature overcomes the problem of a fixed thread design, which would have only one final rotational position. In the example embodiment, the total length of the laser assembly 76 including the length of the specially designed objective 54 is equal to the length of a standard 45 mm parfocal objective. The complete laser assembly 76 fits between the turret 58 and the stage 62 of a microscope. Although the system is designed for use in inverted microscopes, it can easily be used in upright microscopes as well.

In the particular application of ZP hatching and embryo biopsy, a shortened objective 54 is utilized, with magnification 50× and NA=0.6. The objective 54 is made to transmit more than 90% power at the wavelength of $\lambda=1480$ nm. The laser diode 66 is precisely positioned within the laser assembly 76, and is maintained in the required rigid optical relationship with the other parts of the laser assembly 76. The optical injection system 56 therefore remains with the required focal and directional alignment between visible and infrared beams. The entire laser assembly 76 can therefore be transferred to other microscopes 65 (see FIG. 2A) without changing the relationship between the optical components forming the laser assembly 76, and without requiring realignment.

Electrical power to the laser diode 66 is provided from a standard control circuit 78 on a conventional printed circuit board (PCB) 80. The PCB 80 may be mounted in a separate box, or as a board inside a computing apparatus 82. A cable 84 between the computing apparatus 82 and the laser assembly 76 connects each component to the other. The cable 84 normally connects to the laser assembly 76 with a rotational swivel, such that the microscope turret 58 (see FIG. 2A), and any of the other objectives used, can rotate without causing inconvenience from the controlling cable 84. It should be noted that inclusion of Zener and Schottky protection diodes (not shown) mounted on interface PCB 106 of FIG. 4 within the laser assembly 76 minimizes risk of standard electrostatic-damage to the laser diode 66. The laser diode 66 is further protected by automatically shunting the laser diode 66 connections when the control cable 84 disconnects from the interface PCB 106 within the laser assembly 76.

A software application installed on the computing apparatus 82 controls the laser assembly 76 (laser power, laser pulse length, laser multipulse). The phrase "computing apparatus" as used herein refers to a programmable device that responds to a specific set of instructions in a well-defined manner and can execute a set of instructions. The computing apparatus 82 can include one or more of a storage device, which enables the computing apparatus to store, at least temporarily, data, information, and programs (e.g., RAM or ROM); a mass storage device for substantially permanently storing data, information, and programs (e.g., disk drive or tape drive); an input device through which data and instructions enter the computing apparatus (e.g., keyboard, mouse, foot switch, or stylus); an output device to display or produce results of computing actions (e.g., display screen, printer, or infrared, serial, or digital port); and a central processing unit including a processor for executing the specific set of instructions. The computing apparatus has access to code for transmission of the microscope image on to a monitor (not shown). The code includes routines for measuring the image, storing and retrieving electronic images, operating the laser assembly 76, and generating and printing reports.

Figure 3A:
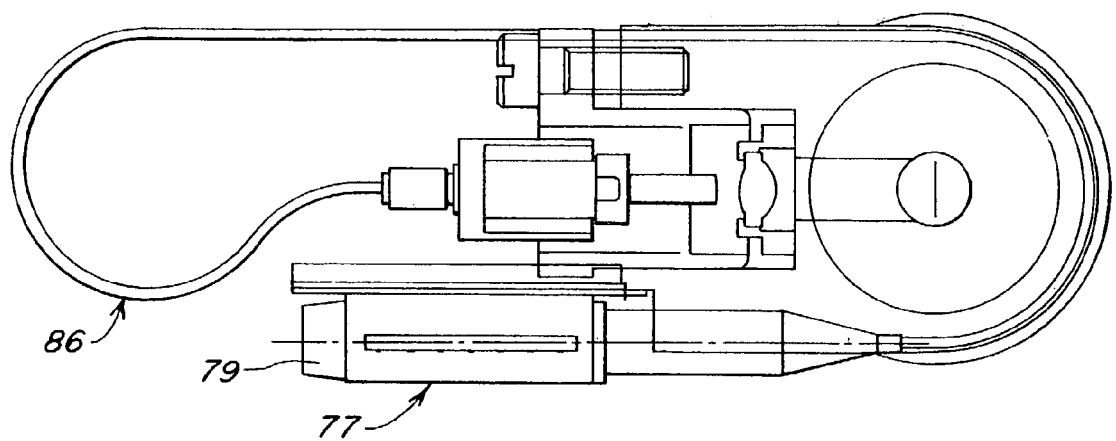
FIGS. 3A and 3B are perspective illustrations of a fiber optic and microscope arrangement according to one aspect of the present invention.
Figure 3B:
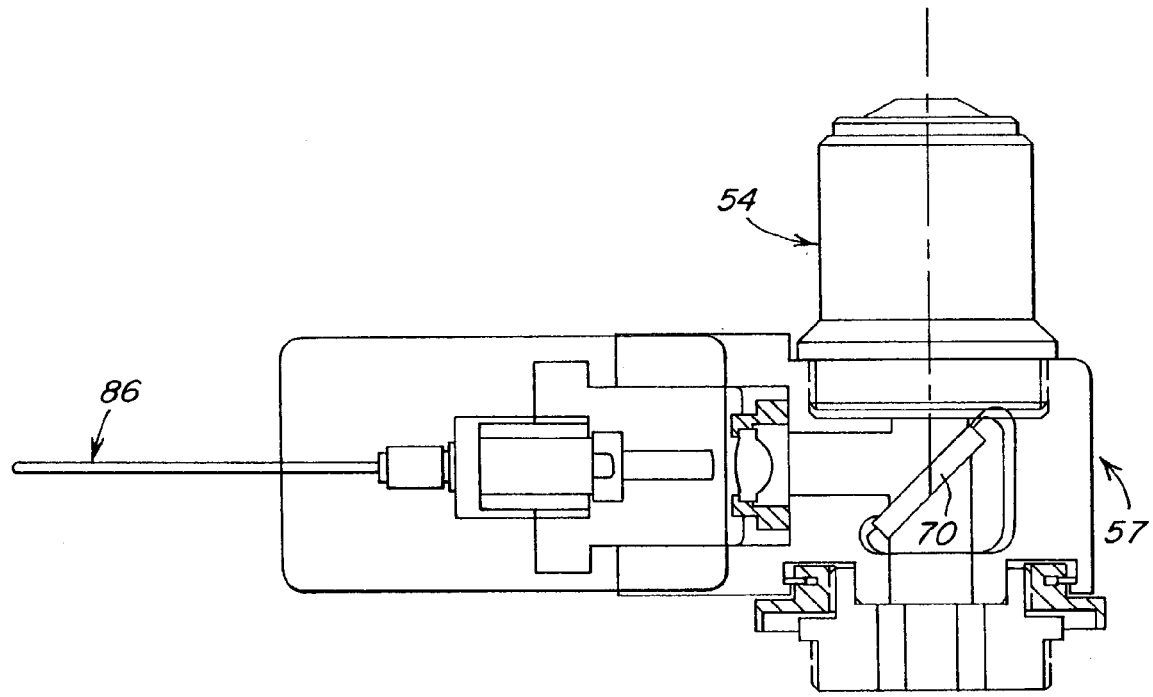

As shown in FIGS. 3A and 3B a fiber-optic cable 86 may be substituted for the laser diode 66 in an optical injection system 57. A laser 77 is then located at the other end of the fiber optic cable 86, together with an electronic laser control circuit 79. This may be built in to an optical injection system 57, in a separate system, or built on to a PCB for insertion into a computing apparatus. In the latter case, the fiber-optic cable 86 plugs directly into the PCB in the computing apparatus and no electric connections are required between the assembly and the computing apparatus. In the example embodiment, the laser 77 provides the necessary signal through the fiber-optic cable 86 to the dichroic mirror 70, which reflects the signal to the objective 54 as before. The substantial difference in this embodiment is the use of the fiber optic cable 86, which can allow the laser 77 source to be located in a number of locations proximal or distal from the optical injection system 57.

The use of fibers has the advantage of producing an almost Gaussian beam, allowing relatively good focusing properties. Fibers may be spliced to introduce a visible beam (for aim spot or focus spot) co-directional with the IR beam. However, fibers also have the same problem of particle obscuration mentioned above.

It should be emphasized that the design used in the present invention can be applied to substantially any embodiment of a laser to be used for microscope irradiation. Some examples include laser cutting, e.g., at a wavelength of $\lambda=337–390$ nm, laser scissors and laser tweezers, and laser differential heating. DNA denaturing (e.g. nucleus ablation) is another application. The system can be extended to any laser from which the power is delivered in a fiber-optic cable. The present invention is not limited to inverted microscopes. It can be used in an upright microscope, and requires no adjustments when transferred between one type of microscope and another.

Figure 4:
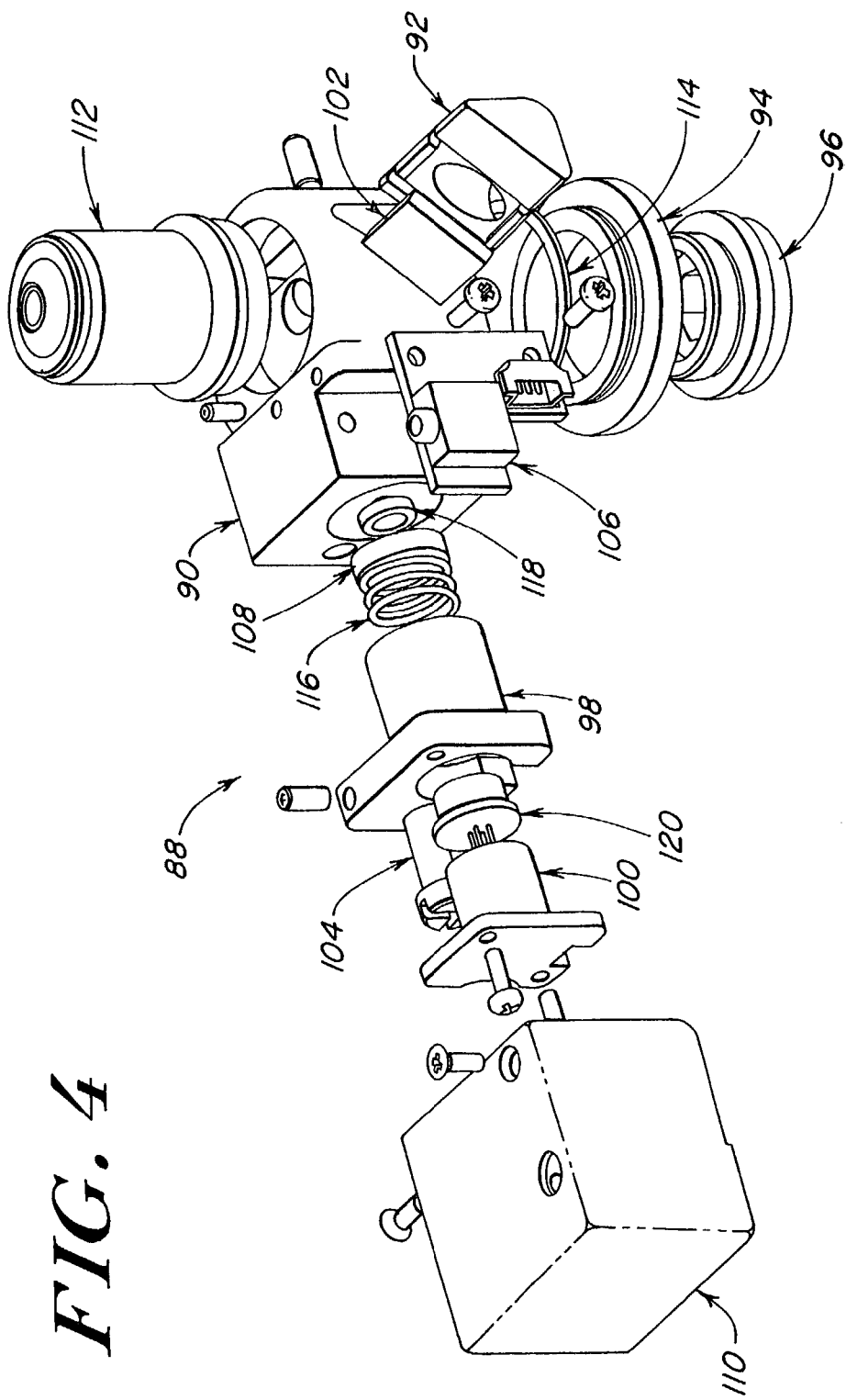
FIG. 4 is an exploded diagrammatic illustration of a first embodiment of the laser assembly according to one aspect of the present invention.

FIG. 4 illustrates another detailed example embodiment of an optical injection system 88 built in accordance with the teachings of the present invention. A first embodiment of the optical injection system 88 was designed and machined, and is shown in FIG. 4. A body 90 houses the elements of the optical injection system 88. A mirror mount 92 provides support for a dichroic mirror 102. An adapter nut 94 attached to the body 90 with a retainer ring 114 mounts the laser system to a turret adapter 96. A diode mount 98 and diode clamp 100 support a laser diode 120, while a compression spring 116 pushes against the diode mount 98. A focus screw 104 is used to adjust the laser light. A connector on interface PCB 106 is suitable for connecting the assembly with a computing apparatus (such as the computing apparatus 82 of FIG. 2B). A lens bushing 108 positions a lens 118. A cover 110 surrounds the laser portion of the optical injection system 88. A compact objective 112 mounts substantially orthogonal to the laser diode 120 direction.

The optical injection system 88 was used with a specially designed HTB short lens, and the assembled unit with lens had a parfocallength of 45 mm, equivalent to the length of a standard objective. The optical injection system 88 was demonstrated on a Nikon TE 300 microscope, then transferred to a Leica DMIL, Zeiss Axiovert 25 and an Olyrnpus IX-70 microscope. In all cases, the focus of the IR beam did not have to be adjusted, and the unit gave high quality images. Standard tests on the HTR 3 μm grid showed no detectable image difference between the microscopes.

The IR transmission is also independent of the microscope, since it can only depend on the optical injection system 88. The value of the transmission, T, was measured with the system by removal and replacement of the objective, receiving the beam in an OPHIR Nova NIST-traceable detector. The result was T=90%, close to the values obtained with the standard objective.

The size and quality of the holes drilled in test bovine oocyte samples was measured. The results fell within the predictions expected from the thermal diffusion transfer theory [Douglas-Hamilton DH and Conia J (2001)]. This result would be expected since the entire imaging apparatus is contained within the optical injection system 88.

The teachings of the present invention provide for IR focal adjustment to be required only at installation. The laser assembly can be fitted to any microscope without changes. The optical injection system works on inverted and on upright direct transmission microscopes. Short optical path gives maximum beam power available. High beam power avoids damaging local cells that are not targeted. The optical injection system can be adapted to fiber optic sources. The entire electronics associated with the optical injection system can be contained inside computing apparatus. The optical injection system is small and lightweight, and does not require special installation. The optical injection system can further be returned for factory servicing, and re-installed by a user without losing its alignment or requiring optical adjustments.

An illustrative embodiment of the present invention also relates to a method for calculating and displaying the isothermal contours generated by a laser in a sample is also provided. As used herein, the term "isothermal contours" refers to the array of maximum temperatures generated by a laser pulse at particular locations within a sample, e.g., the ZP of a pre-embryonic cell. The locus of all points reaching the maximum temperature represents an isothermal contour of maximum temperature or peak thermal excursion. The method includes applying a laser beam to the focal point of a sample, dividing the region near the focal point into cylinders coaxial with the beam, deriving the maximum temperature reached during the laser pulse of at least three points at arbitrary distances from the focal point, plotting the temperatures calculated as a function of distance from the focal point sufficient to generate isothermal contours, and generating a computer display of said isothermal contours corresponding to the temperature calculations.

The isothermal contours illustrate the thermal effect of a laser beam on a sample, e.g., the ZP of a pre-embryonic cell. A wavelength of approximately 1480 nm radiation is strongly absorbed in water and, therefore, absorbed in all living tissue. Consequently, the region of the laser beam in an aqueous medium becomes significantly heated and the temperature rise at the focal point can easily reach $\Delta T=150°$ C. by the end of the laser pulse. The ZP melts at a temperature of about T=140° C. Therefore, the ZP will be removed within a ring corresponding to peak temperature T of about 140° C.

The thermal energy deposited by the laser beam is conducted away through the medium. During the laser pulse a dynamic balance is set up between the laser heating and the thermal conduction rate which results in the temperature rising rapidly until a steady-state temperature is reached. Generally, the pulse is terminated long before the steady-state. Consequently, regions at different distances from the focal point reach different temperatures that depend on the pulse duration, the beam intensity, distance from focal point, and conductivity of the medium. The temperature at or near the focal point of the beam can be as high as $\Delta T>200°$ C. The temperature falls rapidly with increasing distance from the focal point. In order to ensure the safety of the laser system and the success of the laser beam manipulations, it is very important to accurately calculate the particular temperatures at various positions of the sample.

The medium containing the sample should be compatible for various types of organic structures, such as embryos, blastomere, or other cells. These structures will differ in chemical composition from the medium itself and in general will have different thermal properties. The thermal diffusion equation can be solved in this type of geometry and the thermal history derived at every point. The locus of all points reaching a particular maximum temperature represents an isothermal contour of peak thermal excursion. However, since the major component of most biological structures is water, the samples will have thermal and IR-absorption properties similar to those of water.

A theoretical derivation of the thermal diffusion regime for an isotropic medium has been given by Douglas-Hamilton and Conia (2001) (*J. Biomed Opt.* (2001) 6:205–13 "Thermal effects in laser-assisted pre-embryo zona drilling"), incorporated herein by reference. The region near the focal point is divided into cylinders coaxial with the beam and the thermal history at arbitrary distances from the focus is derived which determines the thermal regime or isothermal contour as a function of distance. Such values also specify the distance from the focus required to maintain safety. In particular, these calculations are applied to cells that are within the embryo while the ZP is being drilled, in order to maintain a safe stand-off distance between the drilling operation and the embryonic cells. The temperature of the medium near the beam was measured experimentally and confirms the theoretical thermal predictions. Any medium anisotropy can be included in the calculation and the appropriate isothermal contours derived.

Using the foregoing thermal profile, the maximum temperature reached during the laser pulse as a function of distance from the beam axis is plotted and expressed as a series of isotherms, each representing the peak temperature reached during (or after) the laser pulse. To first approximation, the medium may be treated as isotropic and the peak-temperature isotherms contours are generated as rings centered on the beam axis or focal point. The isotherms are displayed on a computer display centered on the beam focal point and can be identified by color or label to give the local peak temperature computed from the thermal diffusion model. Because the local heat input depends on the laser power and the laser pulse duration, the diameter of the isothermal rings will vary as a function of the laser power and pulse duration.

Figure 5:
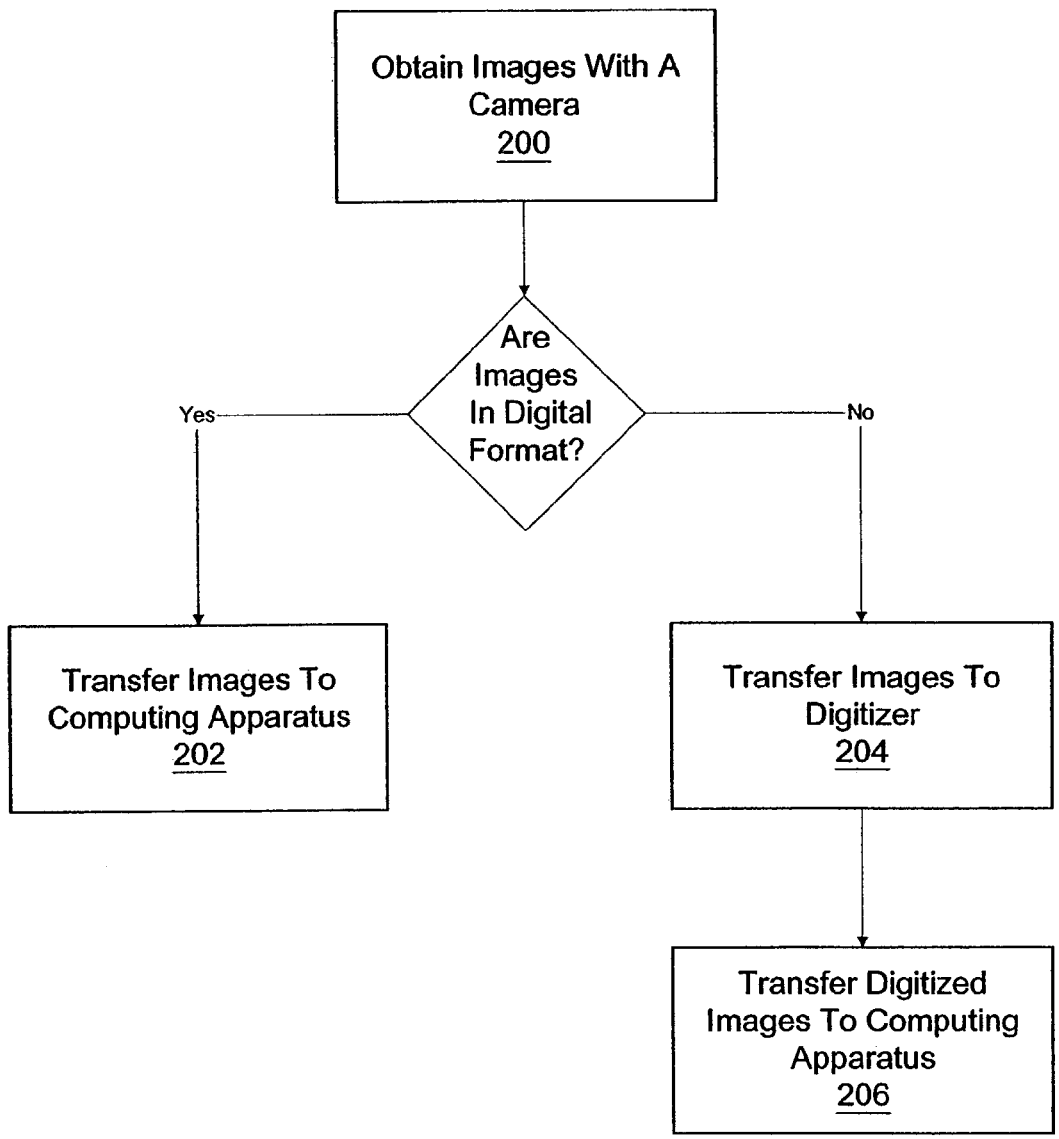
FIG. 5 is a flowchart illustrating the capture of images and conveyance to the computing apparatus according to one aspect of the present invention.

The computing apparatus 82 can display the isotherms as described in the above example application, or a different computing apparatus can be utilized to display the isotherms. Prior to displaying the isotherms, the computing apparatus 82 must first obtain images of the sample as viewed through the microscope. To accomplish this, and as illustrated in FIG. 5, the microscope images are either taken with a digital camera or an analog CCD camera (step 200). If the images are taken with a digital camera, or are otherwise in digital format, the images are transferred directly onto the monitor screen (step 202). If the images are not in digital format, the analog signal is transferred to a digitizer board (step 204) to be digitized [e.g. the Bandit digitizer/display board from Coreco Corp, Quebec, or equivalent]. The digitized image is then transferred directly to the screen (206). In either instance, the image can be over-written with information from a digitizing system, so that any computer information may be superimposed on the image.

Figure 6:
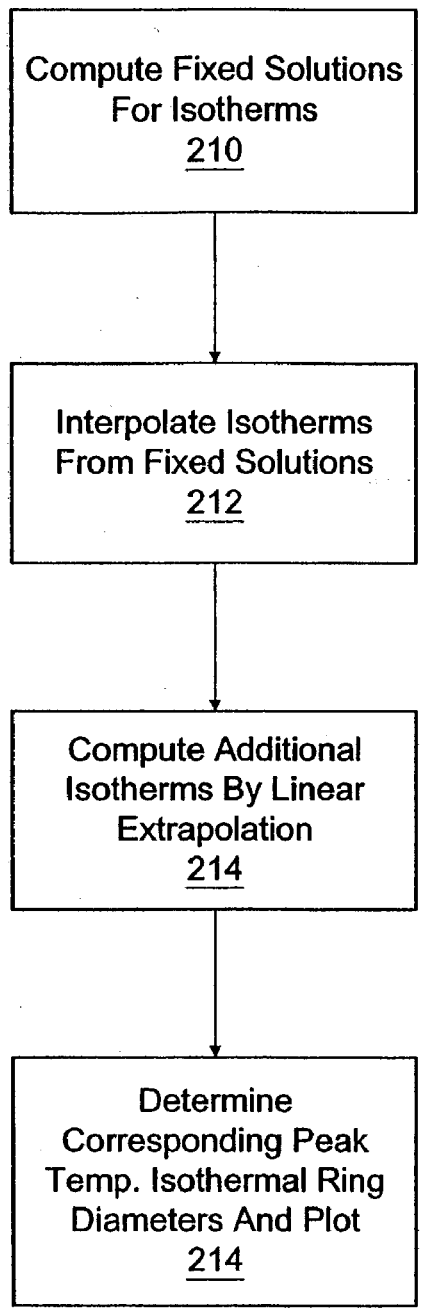
FIG. 6 is a flowchart illustrating the generation of isothermal rings according to one aspect of the present invention.

Once the image of the sample is captured from the microscope, the computing apparatus 82 takes the image and superimposes a plurality of isotherms in the form of lines drawn on the image of the sample. The process carried out by the computing apparatus 82 for creating the isotherms can be described as follows, and as illustrated in FIG. 6.

In the example embodiment, the Isotherms are generated by interpolating values from fixed solutions for a 180 mWatt beam of radius 2 micron. The fixed solutions are computed at pulse durations of 0.5, 1, 2, 3, 4, 5, 10, 20 milliseconds (step 210). The isotherms for a beam of power 180 mW at any given pulse duration can be accurately interpolated from the fixed solutions (step 212). By way of example, using a third degree polynomial interpolation gives results within 5% of the correct values. Since the temperature excursion scales directly with beam power, only the computed solutions for different pulse durations at a particular given beam power are required. The corresponding isotherms can then be computed at any other beam power, for the same beam radius, by direct linear extrapolation (step 214).

In practice the system is used at maximum power, and the effect of the beam is controlled by decreasing the laser pulse duration. In this way, the conduction of heat from the laser beam to local (e.g. blastomere) cells is minimized.

The corresponding peak temperature isothermal ring diameters are derived from the laser beam power and the laser pulse duration input at the controls (step 216). For any combination of pulse duration and beam power, there is a single-valued set of rings, corresponding to the positions at which each peak temperature is reached.

It is of great advantage to the user of a laser manipulation system to be able to see at a glance what the effect of the laser will be at positions remote from the actual laser focal point. Therefore, the derived isothermal contours are displayed on a computer screen. In an isotropic medium the contours are rings. The ring diameter depends on the laser power and the laser duration. As the laser power and the laser duration are changed by the user, the rings expand or contract accordingly. This enables the user to see exactly what the potential for embryo damage is with the laser, and to adjust the parameters accordingly.

In application to the drilling of ZP, it is a further advantage of the invention that the size of the hole to be drilled is represented well by the diameter of the 140° C. peak-temperature isotherm. Thus, for any conditions of laser power and laser pulse duration, the diameter of the $T_{max}$=140° C. isotherm gives the diameter of the hole that will be drilled in the ZP.

Figure 7:
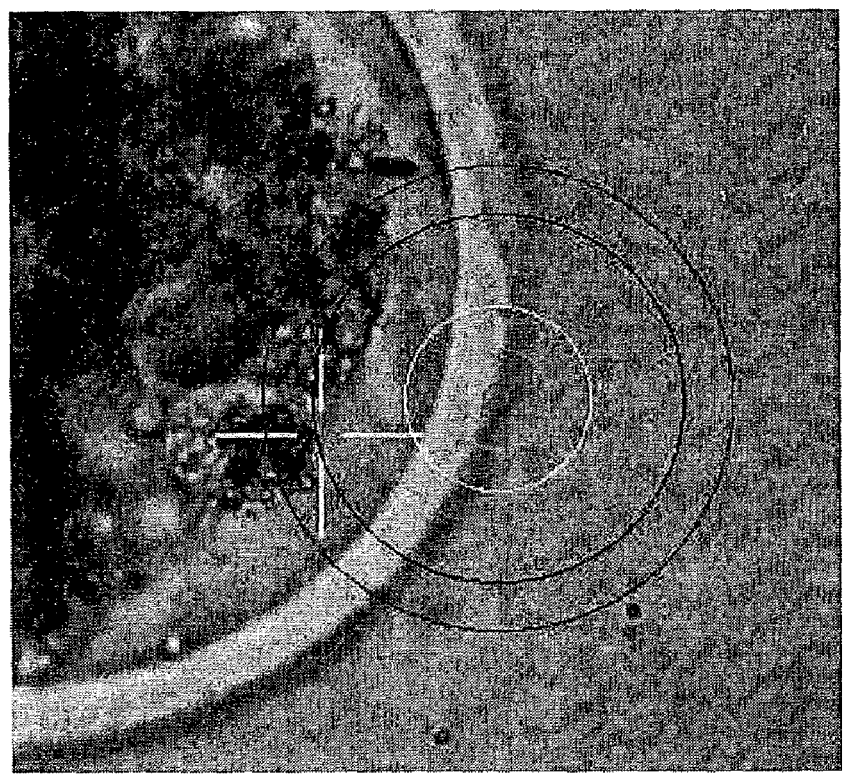
FIG. 7 shows the isothermal contours generated by applying a laser pulse of power 140 mW and duration 3 msec to the ZP of a pre-embryonic cell. The central ring shows corresponds to the laser Gaussian beam diameter, and the rings successively radiating from the central ring show the peak temperatures of 140, 100, 80, 60 and 50° C., respectively.

An example of the invention is shown in the FIG. 7, in which the isotherms are shown superimposed on a scale image of an oocyte indicating the peak thermal excursion that will be experienced at different distances from the laser beam focus by different parts of the oocyte.

The present invention is further illustrated by the following examples which should not be construed as further limiting. Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. Such equivalents are intended to be encompassed by the following Examples and claims.

EXAMPLES

Example 1

Laser Module, Microscope Specifications, and Design

A Nikon TE-300 laser-equipped inverted microscope was used, which has the IR laser beneath the stage. Laser light proceeds up through the objective and is focused on the target. The laser module (ZLTS, Hamilton Thorne Research, Beverly, Mass.) has maximum power 200 mW at $\lambda$=1480 nm, and is utilized in pulsed mode. Peak transmitted laser power through the objective is approximately 140 mW. Pulse duration is adjustable in half millisecond increments from 0.5 to 25 ms. In addition to the laser diode itself, the laser module includes control board, adjustable collimating lens and dichroic mirror, and is inter-locked to prevent potentially hazardous operation.

The laser module fits into the microscope filter cube slot under the stage and the beam is deflected by a dichroic mirror along the optic axis of the microscope. The nearly collimated beam is directed toward the back aperture of a 40×, 0.60 numerical aperture (NA) objective lens, designed to maximize transmission at 1480 nm. The long working distance (WD=3 mm) objective lens is used to focus the laser beam on to the target specimen; it has high transmission ratio in the infrared range (typically about 71% at 1480 nm). The collimation of the beam is adjusted to give parfocality of IR and visible light. Biological specimens, e g., bovine oocytes or mouse pre-embryos, are maintained in an aqueous culture medium in clear polystyrene Petrie culture dishes (Falcon, Lincoln Park, N.J.). The incident focused laser beam travels sequentially through air, plastic, and then the aqueous solution before reaching the target area of the zona pellucida (ZP).

Delivered laser energy at the objective was measured using a thermal detector head (Ophir Optronics, Peabody, Mass.) placed immediately above the stage with objective removed. Transmission of the objective was determined by placing an identical opposed objective above the focal point to recollimate the beam which passed into the detector. Using the derived transmission, 71% at $\lambda$=1480 nm, maximum beam power at the focal point was estimated at 103 mW, allowing for reflection at the polystyrene Petrie dish and absorption through 75 µm $H_2O$. Pulse duration was checked using an oscilloscope (Tektronix TDS 360) monitoring laser radiation scattered on to a Ge photodiode detector (B1918-01, Hammamatsu, Bridgewater, N.J.). In a preliminary measurement, the focal beam radius in air was determined by intercepting the beam at the focal point with a knife edge which was moved across the beam at known rate while the IR intensity was monitored with the Ge detector. At the focus, the radius to the $1/e^2$ intensity level was $R=3.1\pm0.5$ μm. The focal cone half angle in the medium is 26.7°.

Example 2

Laser-Assisted Zona Dissection with Bovine Eggs

Bovine eggs are readily available. They constitute a useful and cost effective model for testing laser-assisted zona drilling protocols. The Nikon TE300 inverted microscope is used with illumination source and condenser above specimen and objective below. The Petrie dish specimen chamber (wall thickness 1 mm, diameter 50 mm) is on a motorized stage. The eggs settle at the bottom of the dish and the objective is focused on the edge of the ZP, about 75 μm into the medium.

Figure 8:
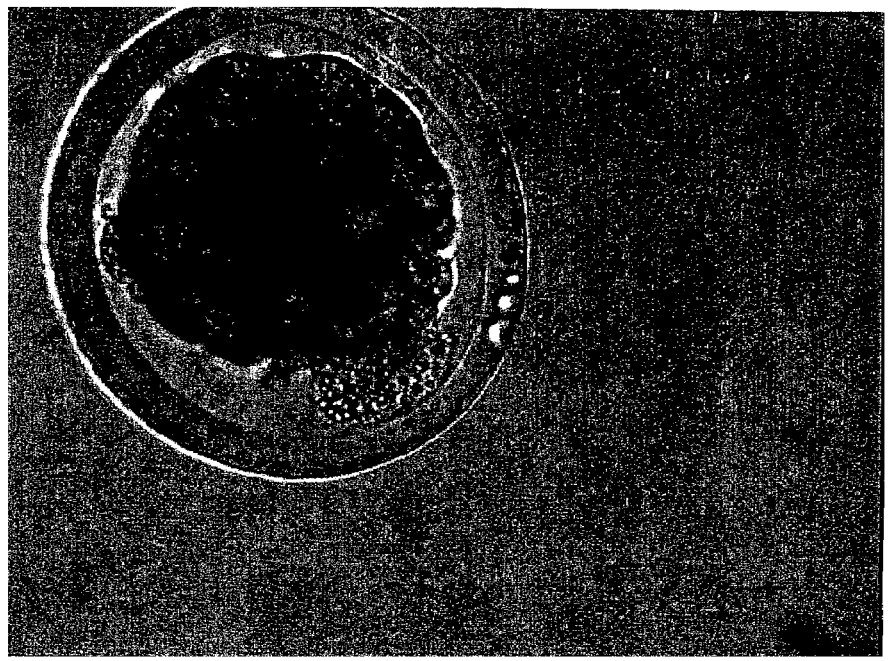
FIG. 8 shows laser ablation of ZP of bovine eggs at 100 mW, pulse duration 1.5, 3, 4.5 ms.

A typical zona drilling is shown in FIG. 8 for a bovine oocyte. The egg diameter is about 150 μm and the thickness of the zona pellucida, the translucent shell surrounding the egg, is about 12 μm. The laser power was set to 100 mW delivered at the focal point and three points in the ZP corresponding to pulse duration 1.5, 3, and 4.5 ms. Beam diameter to $1/e^2$ was 6.2 μm, independent of beam power. The hole diameters are 4.3, 7.8, and 10.5 μm; the hole diameter depends more on pulse duration than on laser beam size.

Figure 9A:
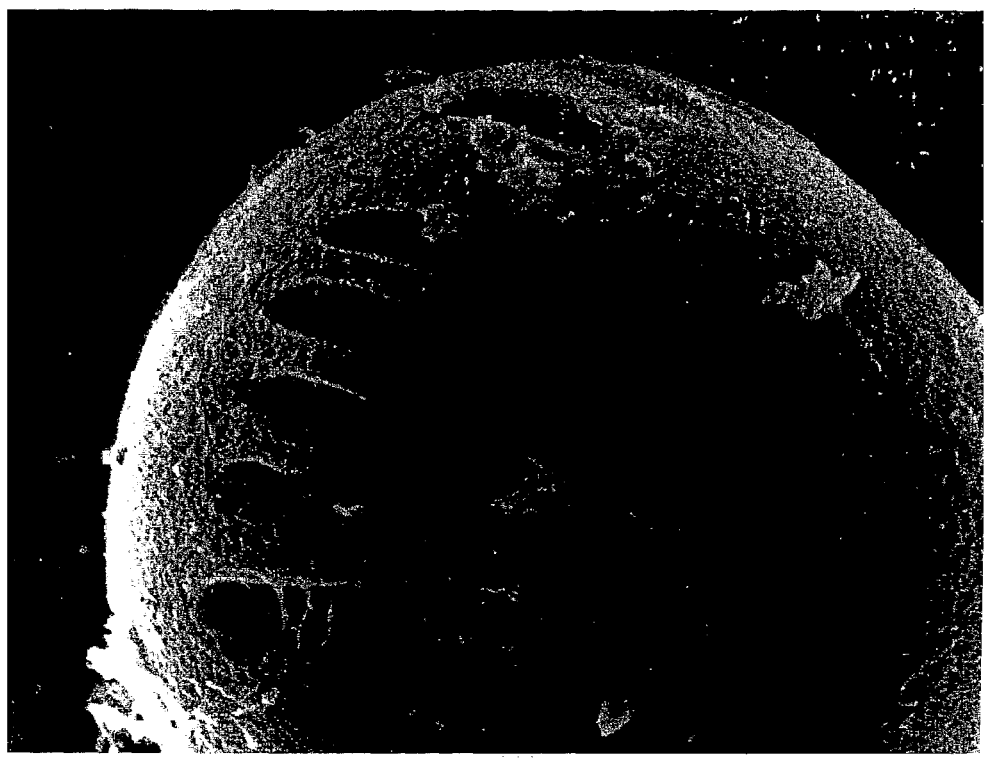
FIG. 9A shows bovine eggs in which several channels have been cut by laser.

In FIG. 9A an electron photomicrograph of several channels in a bovine egg is shown. Repeated firing at constant laser pulse length 25 ms and laser power 50 mW produced channels of consistent size.

Figure 9B:
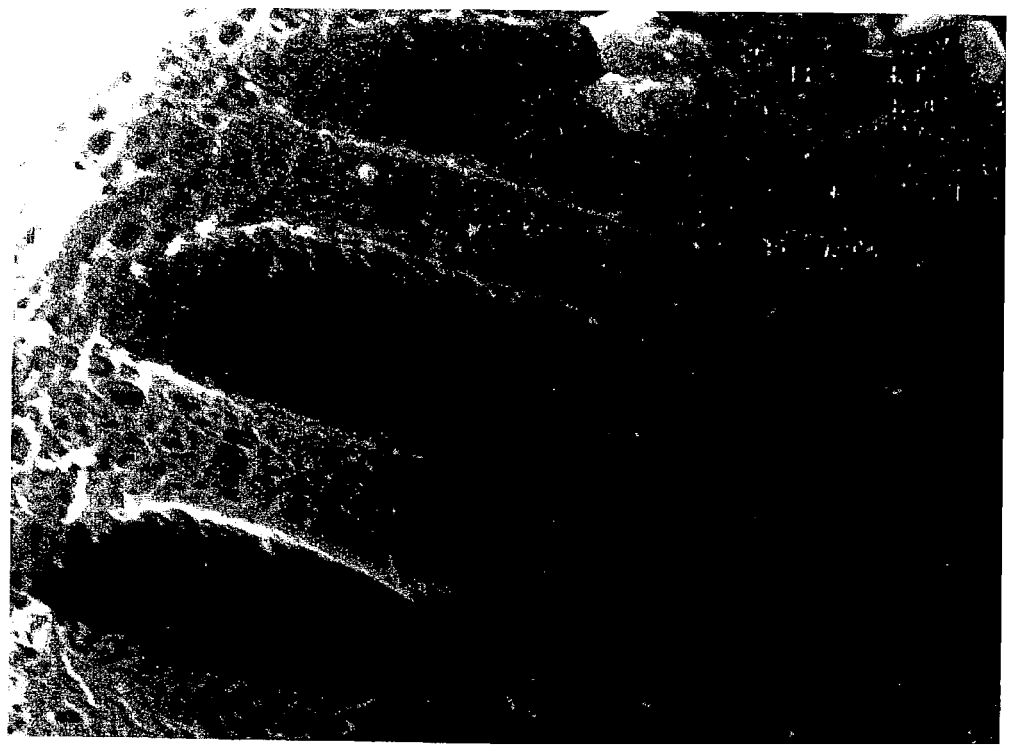
FIG. 9B shows a close-up view of the channels in bovine ZP. The channels are approximately 25 µm long, almost constant-radius cylindrical intercepts with sharp edges and do not show effects of beam convergence or divergence.

The close-up in FIG. 9B emphasizes the sharply drilled wall of each channel. The channels have clear cylindrical cross sections of width approximately 12 μm with no significant beam broadening at either end. The channels reflect a thermal dissolution "melting" temperature and its locus is not coterminous with the beam edge. Although no evidence of thermal damage can be seen surrounding the target area, the transient thermal excursion may cause damage invisible under the microscope to nearby living cells. The thermal history of the laser drilling is derived as described below.

Example 3

Thermal Predictions

Standard Conditions

The objective (NA=0.6, 40×, infinity corrected) used transmits 71% of the incident energy at $\lambda=1480$ nm. The typical laser beam power arriving at the vicinity of the ZP following transmissive, reflective, and attenuation loss is calculated as 100 mW. The typical beam focal radius is calculated as a=3 μm, assuming the beam is passing up through an inverted microscope into medium of refractive index n=1.333. The thermal history or isothermal contour expected along the path of the laser beam and especially in the vicinity of the pre-embryo is derived as described below.

Thermal Constants and Source Function Geometry

Using medium comprised of almost pure water and the cellular material is approximately 80% water, the infrared absorptances in the medium and cell at $\lambda=1480$ nm are approximately that of $H_2O$ and cannot be significantly lower. Similarly, the thermal conductivity of the material will not be higher than that of water. By taking the absorptance as identical to that of $H_2O$, $\alpha=21$ cm$^{-1}$, a lower limit to the temperature produced is obtained. On the time scales of interest (1–25 ms), the only significant mode of heat loss from the heated liquid will be thermal conduction, since convection does not have time to develop and radiation may be neglected. The thermal conductivity of water is $6\times10^{-3}$ w/cm/° at room temperature, but since the thermal excursion during the laser pulse is typically 100–200° C., we take the conductivity of the medium as $K=6.8\times10^{-3}$, corresponding to $H_2O$ at 100° C.

The laser path is approximated as three regions: (1) a converging cone of semiangle θ; (2) the waist region of the beam; and (3) a diverging cone with semiangle θ. The beam has higher net power at the converging than at the diverging cone, due to attenuation. The cone semiangle is $\theta=\arcsin(NA/n)$ 26.7°. For the thermal calculation we approximate the waist region as a cylinder of radius a=3 μm and length $2a\cdot\cot\theta$.

The laser beam converges through the medium to a focal point 75 μm above the floor of the Petrie dish. Absorption will only be important in the medium and may be neglected in the Petrie dish. Self-focusing of the IR beam will not significantly affect the thermal distribution outside the beam and is ignored. The radiation intensity is symmetric in azimuthal coordinate, varying in intensity only with axial distance and radius. Ignoring angular variation, the heat diffusion equation in axisymmetric cylindrical coordinates may be written Equation 1:
$$\frac{\partial T}{\partial t} = k\frac{\partial^2 T}{\partial r^2} + k\frac{1}{r}\frac{\partial T}{\partial r} + k\frac{\partial^2 T}{\partial z^2} + \frac{S}{\rho C_p},$$

where the heat diffusion coefficient is $k=K/\rho C_p$, and $\rho C_p=4.18$ j/cm$^3$, with ρ the liquid density and $C_p$ its specific heat, so $k=1.6\times10^{-3}$ cm$^2$/s. Variation of the diffusion coefficient with temperature is small and is ignored. The origin is taken as the focal point, with r and z as the radial and axial distances. The source function S represents the laser heating power per unit volume and varies across the entire domain.

The source functions in the three regions of the laser path are normalized to the laser power P reaching the focal plane so that the converging beam is more intense below the waist and attenuates as it progresses upward, diverging above the waist. The central cylinder length is short ($2a\cdot\cot\theta=12$ μm), and attenuation is ignored in region 2.

The source functions for attenuated uniform beam in the three regions are

Equation 2 - Converging
$$S_1 = \frac{\alpha P}{2\pi(1-\cos\theta)} \cdot \frac{1}{r^2+z^2} \cdot e^{\alpha(z^2+r^2)^{1/2}}$$

Equation 3 - Waist
$$S_2 = \frac{\alpha P}{\pi a^2}$$

Equation 4 - Diverging
$$S_3 = \frac{\alpha P}{2\pi(1-\cos\theta)} \cdot \frac{1}{r^2+z^2} \cdot e^{-\alpha(z^2+r^2)^{1/2}}$$

The Gaussian profile is approximated by applying the factor $Ae^{-2((arc\ tan\ r/z)/\theta)^2}$ to $S_1$ and $S_3$, where A is a normalization constant, and for $S_2$, we use the factor $Ae^{-2(r/a)^2}$.

Boundaries for Solution of the Heat Diffusion Equation

Equation (1) was solved by finite element analysis (FEA) using the codes COSMOS (Structural Research Co., Los Angeles, Calif.) and Mathlab PDE Toolbox (Mathworks Inc., Natick, Mass.) with source functions from Equations (2)–(4). The beam travels parallel to the axis of a cylinder of radius 100 μm and length 200 μm. For short pulses (τ<6 ms) these dimensions are sufficient to make edge effects negligible since the thermal diffusion distance in time τ is x<30 μm. The axis is a Neumann boundary with zero radial temperature gradient. Since the beam is attenuated, the focal plane cannot be taken as a Neumann boundary. Therefore, the equation must be solved in the entire upper half plane. The cylinder end planes at z=±100 μm and cylinder wall at r=100 μm are both Dirichlet boundaries with temperature held at $T_0$=37° C. The initial temperature of the entire domain is taken as $T_0$.

Of practical interest is thermal history on the focal plane itself at various radial distances from the axis, which will give information on the thermal excursion experienced by the nearest blastomeres.

Preliminary Verification

For comparison with an analytic case, the FEA was run with a uniformly heated cylinder of radius 3 μm in a 200 μm-diameter right cylinder containing $H_2O$ at $T_0$=37, and with source function as in Equation (2), P=100 mW and $\alpha$=21 cm$^{-1}$.

The analytic steady-state solution for the temperature difference between edge and center of an infinite cylindrical region of radius $R_{max}$ heated on axis by a uniform beam of radius R is Equation 5:

$$\Delta T = \frac{\alpha P}{4\pi K}\left[1 + 2\ln\left(\frac{R_{max}}{R}\right)\right]$$

The FEA steady-state result was within 0.5% of the temperature difference from Equation (5). Therefore, the system is integrating correctly.

Standard Case

Figure 10A:
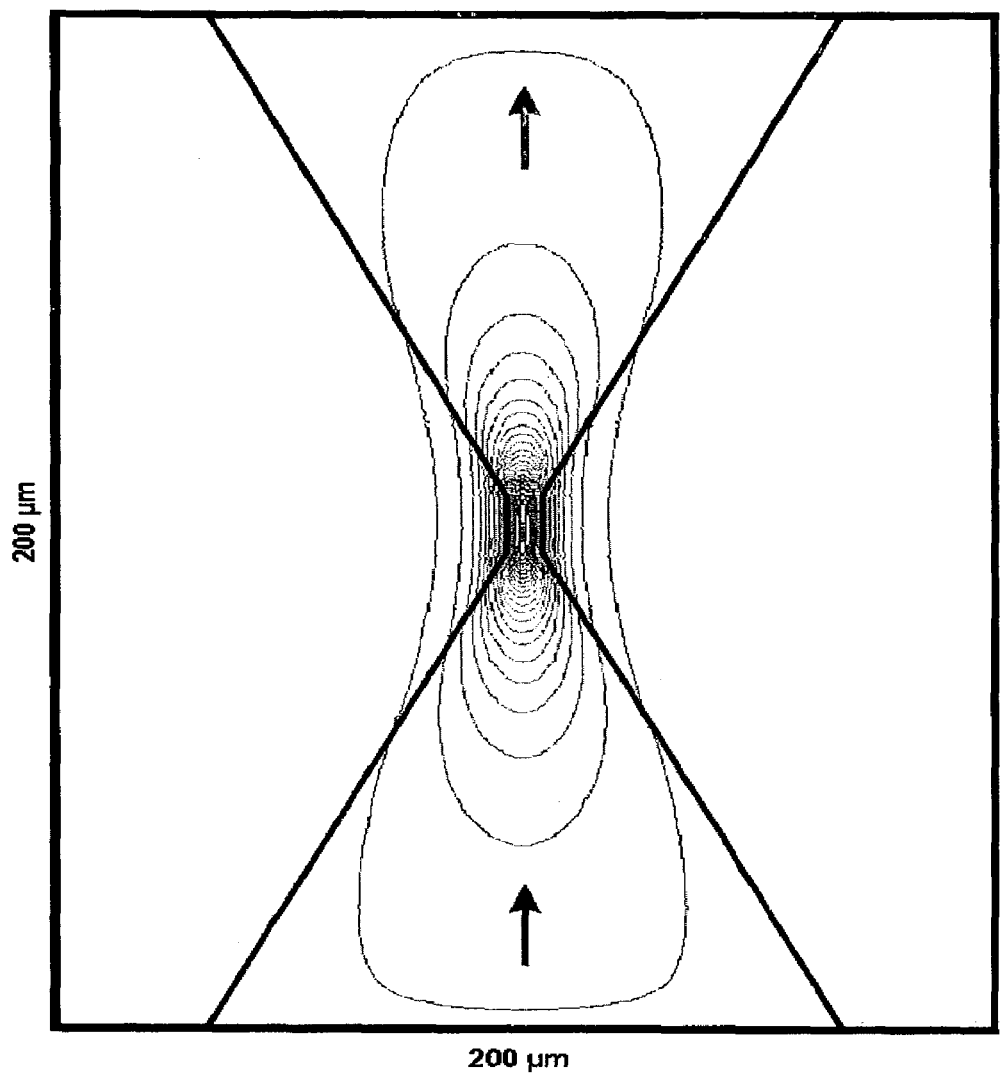
FIG. 10A shows FEA analysis of 3 ms pulse, 100 mW, converging Gaussian attenuated beam solved in half plane. The isotherms at 0.1 ms into the pulse are indicated. Isotherm interval is 2.5°. Central temperature is 98.8° C.
Figure 10B:
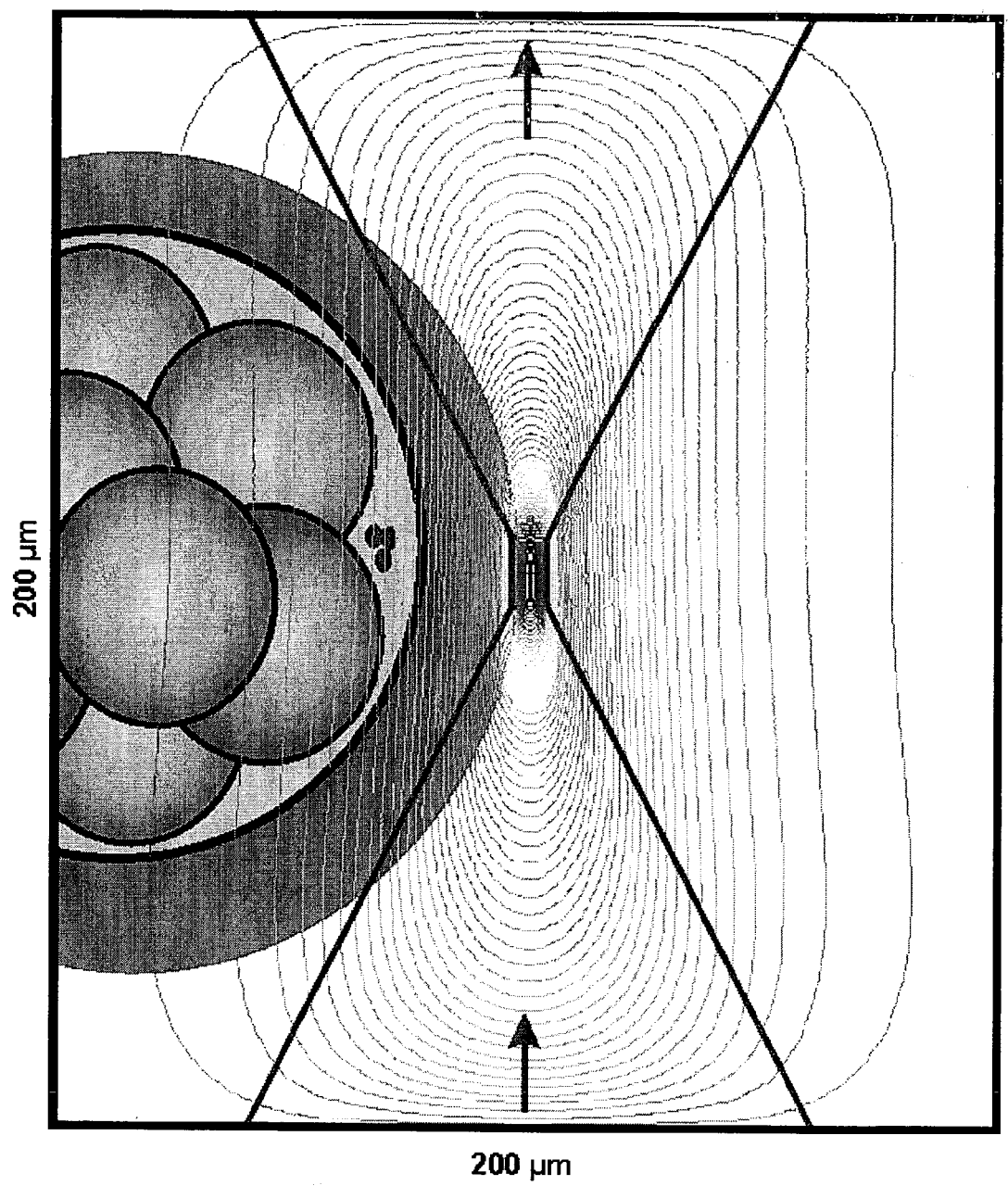
FIG. 10B shows FEA analysis of same case as in FIG. 9A, at 3 ms. Isotherm interval is 2.5° C. Central temperature is 189° C.

The initial temperature is taken in the medium at the physiological $T_0$=37° C. in a cylinder of diameter 200 μm and length 200 μm, with attenuated converging beam of NA=0.6. The field is divided into 1.13×10$^5$ elements. The same temperature $T_0$ is held at the end planes and at the radius $R_{max}$=100 μm. Beam power is 100 mW at the focal waist, with pulse duration 3 ms and radius 3 μm. The problem is solved in the half plane and has been converted to the full plane in FIGS. 10A and 10B where the beam direction is bottom to top, shown for times 0.1 and 3 ms, respectively. At 0.1 ms the central temperature is 98.8° C. In FIG. 10B, at 3 ms the central temperature is 189° C. If the beam is flattop instead of Gaussian, central temperature is reduced approximately 15%. In either case, these high temperatures imply the potential presence of superheated medium. The temperature change from the initial value at any time depends on the pulse duration and is directly proportional to the beam power (see Equations (1)–(5)). Predictions for any beam power may be scaled from the results reported.

The effect of attenuation is apparent in the slightly non-vertical slope of the isotherms as the beam progresses from below to above the waist in FIGS. 10A and 10B. Apart from this effect, the converging and diverging parts of the beam away from the end planes result in almost cylindrical isotherms. For the present purpose the focal plane is the only region of interest in questions of cell heating. Therefore, the question of whether the focal plane temperature heating can be approximated by a simpler (and faster) one-dimensional solution is examined.

To test the effect of geometry the FEA system was run for the Gaussian beam in the following three cases, all with power 100 mW, pulse 3 ms, and radius 3 μm:

1. Attenuated beam, NA=0.6 (converging cone, central cylinder radius 3 μm, converging/diverging cone);
2. Unattenuated beam, NA=0.6 (same as above, exponential terms in Equations (2) and (4) set to unity); and
3. Unattenuated beam, NA=0 (uniform central cylinder radius 3 μm, exponential terms set to unity).

The latter case corresponds to a constant cylindrical beam and has one-dimensional symmetry, whereas the first two require two dimensions.

For all three cases, predicted temperatures on the focal plane for radii 5≦radius≦50 μm as function of time are within 0.5° C. over 10 ms integration time. At least on the focal plane, in the present case the converging and diverging beam produces heating very similar to that from a long heated cylinder, and if the power is normalized to its value at the focal plane, the effect of beam attenuation may be ignored. Hence, the mathematically simpler case of the cylinder can be used for predicting the temperature history at points on the focal plane. Accordingly, the one-dimensional Gaussian elimination solution has been used as set forth below.

Example 4

Solution in Cylindrical Symmetry

Gaussian Elimination

The FEA solution shows that radial temperature history is almost cylindrical with isotherms close to parallel to the axis over the region of interest. If the heating effect of the beam is approximated as a cylindrical region of constant radius "a" equal to its focal radius, Equation (1) can be written as a one-dimensional difference equation, which can be rapidly solved by Gaussian elimination[17, 18] to give the thermal time history in the region near the laser focus. The advantage of this is that solution is much faster than FEA, and the case of pure cylindrical geometry without converging and diverging beams gives a good approximation to the focal plane temperature. A Gaussian elimination (GE) code to model the thermal behavior in the radial dimension is described herein.

The area 0≦r≦$R_{max}$ is covered and the $R_{max}$=100 μm is chosen because at the laser pulse lengths considered, the thermal excursion does not reach $R_{max}$ before the end of the pulse. The cylindrical area is divided into N shells, each separated by $\Delta r$=$R_{max}$/N. Accurate results are obtained with $\Delta r$=100 μm. As boundary conditions, the initial temperature and the temperature at r=$R_{max}$ are set to $T_0$=37° C. The temperature gradient at beam center is set to zero. In the GE analysis, it is assumed that the beam is flattop rather than Gaussian: this reduces central temperature by about 15%, but does not affect temperature history outside the beam. Equation (5) is used to check the result and find agreement within 0.1% between the GE code and Equation (5) for very long (200 ms) pulses, so the GE code gives correct results for the analytic case.

Thermal Histories on Focal Plane

The GE solutions for temperature at various radial positions on the focal plane are shown as function of time in FIG.

11. The standard case of beam power 100 mW, pulse duration 3 ms, in a 200 μm right cylinder initially at 37° C. is used. At beam center the peak temperature reaches over 170° C. Temperature falls off sharply as the pulse terminates due to the short diffusion time over 3 μm. As expected, the thermal excursion seen near the beam has approximately the same duration as the laser pulse.

Superheating

The calculated (GE) peak central temperatures at typical beam powers with beam radius 3 μm in water are given for flattop beam focal spots of various pulse durations in Table 1 with steady-state values from Equation (5) for reference. Again, the region of the analysis is taken as a cylinder of length 200 μm and radius 100 μm. The calculated temperature of water exposed to the beam is very high, with peak central beam temperature ranges up to above 200° C., corresponding to highly super-heated water. The question is whether this temperature is real or whether a phase change occurs which would reduce the central temperature and form a column of vapor bubbles along the beam axis near the focal point. Miotello and Kelly[19] have examined the formation rate of homogeneous nuclei and subsequent explosive phase change in superheated liquids. In the absence of a surface for heterogeneous nucleation, homogeneous nucleation is necessary for rapid phase change, and its rate depends strongly on how close the liquid is to the critical temperature ($T_c$=647 K for $H_2O$). The homogeneous nucleation rate becomes significant near 300° C. However, at and below 250° C., the rate of homogeneous nuclei formation in water is negligible and, in the absence of sites for heterogeneous nucleation, boiling within a 25 ms pulse is not expected. If nucleation sites are present in the liquid remote from the walls, boiling could occur. While it is possible that the ZP or local suspended particles may provide sites for nucleation, it is unlikely since sharp solid edges are generally more favorable.

Thermal calculations indicate that highly superheated water is briefly formed in the focal waist of the IR beam. Heat is conducted mainly radially away from the waist, and regions near the beam will be heated by conduction. Superheated water is an excellent solvent, and it is not surprising that the region of ZP within the focal waist rapidly disappears.

After the beam is turned off any vapor bubbles formed would be expected to collapse in less than 1 ms, releasing heat to the liquid. If a significant degree of phase change had occurred, the temperature at the beam core would be held to close to 100° C., which would result in lower radial temperatures in the focal plane. The presence of superheating could be tested by measuring local temperature excursions.

TABLE 1

Peak Central Temperatures

| Power (mW) | Pulse Duration (ms) | At End Pulse (° C.) | Steady State (° C.) |
|---|---|---|---|
| 100 | 1.5 | 155.4 | 233.9 |
| 100 | 3.0 | 172.3 | 233.9 |
| 100 | 4.5 | 182.3 | 233.9 |
| 100 | 6 | 189.3 | 233.9 |
| 100 | 10 | 201.9 | 233.9 |
| 100 | 15.0 | 211.7 | 233.9 |
| 100 | 25 | 223.0 | 233.9 |
| 80 | 15.0 | 176.8 | 194.5 |
| 40 | 15.0 | 106.9 | 115.8 |

Example 5

Temperature Check from Probe Beam Steering

Beam Steering

In order to confirm the predicted temperature excursion, the change in local refractive index around the IR focal waist caused by the temperature excursion was estimated. The steering effect caused by the thermal-induced refractive index gradient on an orthogonal probe beam was used. Estimates show that a 2° change in ray direction would be possible for light passing near the IR heated water column.

Optical System

Figure 12:
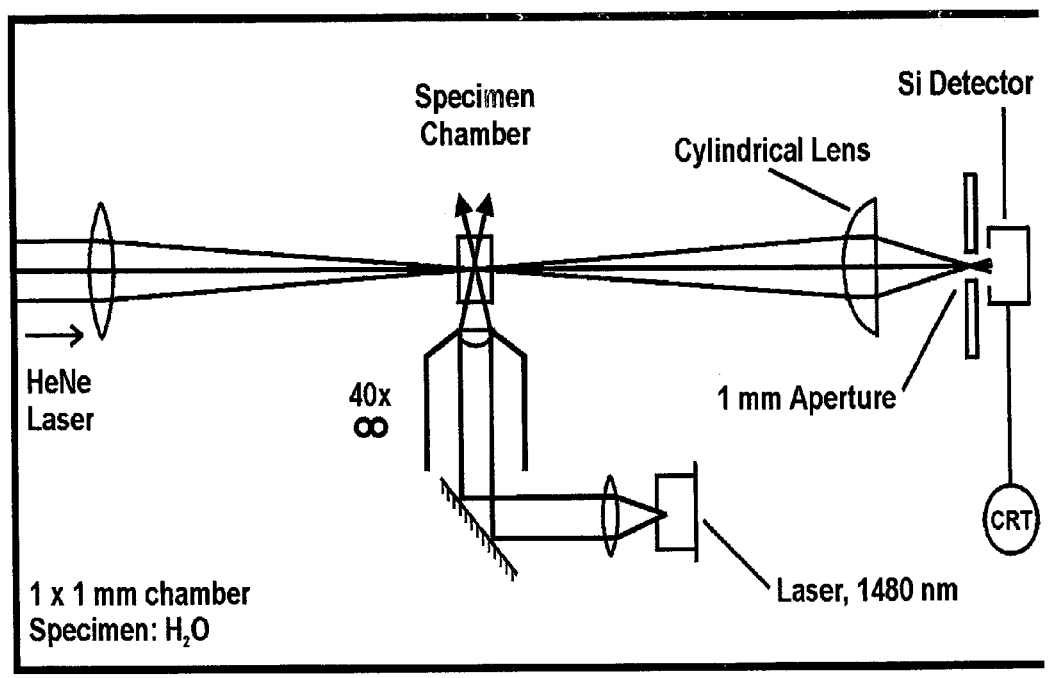
FIG. 12 shows the measurement of beam steering (horizontal view).
Figure 13:
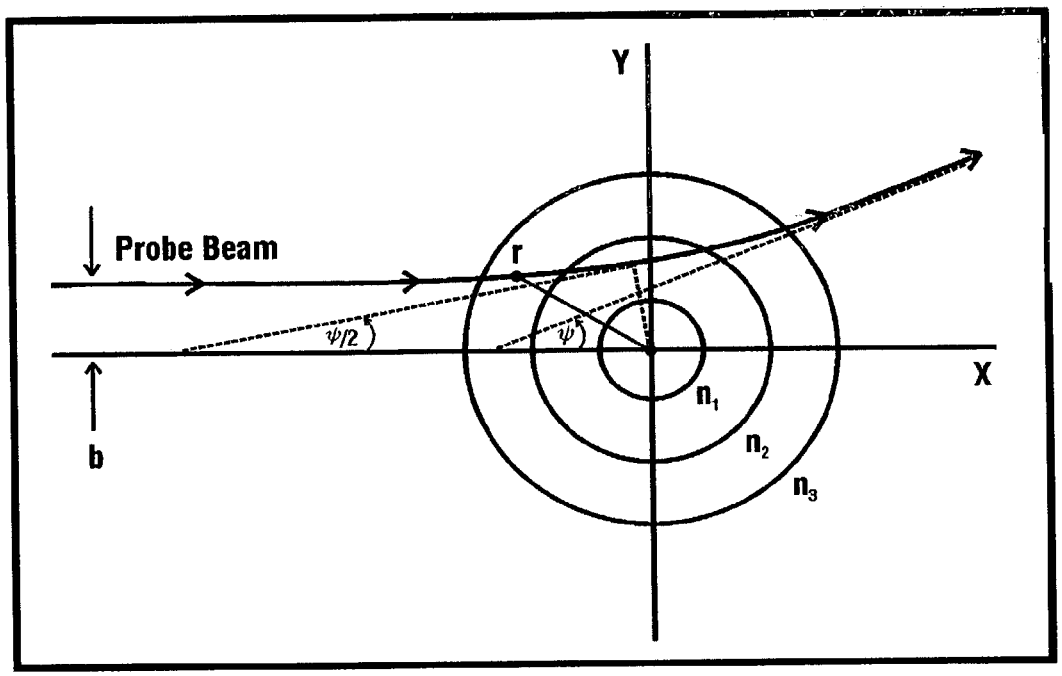
FIG. 13 shows the bending of ray with impact factor b near a central refractive field (vertical view).

The setup is shown in FIG. 12. The IR beam passes vertically into a 1×1 mm glass-walled rectangular tube (Vitrocom, Mountain View, N.J.) containing distilled $H_2O$. The laser is set to pulse at 4 Hz, while beam power and pulse duration are varied. The IR beam focus is set at approximately 200 μm above the bottom wall of the rectangular tube. The IR beam focal diameter has already been measured at close to 2a=6 μm. A horizontal probe continuous wave (cw) HeNe laser beam is focused with an f=120 mm lens into the region of the IR beam focus, with the HeNe optic axis orthogonal to the IR beam axis. The HeNe probe beam radius to the $1/e^2$ points at its focal point was measured by knife intercept as 22.3±1.2 μm. The probe covers the region of interest near the IR focus. The HeNe beam is then focused with a cylindrical lens on to a 1 mm aperture in front of a Si detector. By scanning the aperture+detector in the direction orthogonal to both laser axes, the angle by which the probe beam is refracted (or scattered) by the thermal field around the IR beam is determined. The system is used to measure the maximum angle through which the probe beam is turned at given pulse length/power. This is then compared with the angle derived from the predicted thermal filed.

Probe Ray Steering

The curvature of the probe ray is proportional to (and in the direction of) the normalized refractive index gradient $\nabla n/n$. In the IR beam focal plane the temperature field, and consequently the refractive index, in the specimen must be radially symmetric around the IR axis. The refractive index will decrease toward the IR axis during the IR pulse, and a probe ray traveling in the focal plane of the IR beam will be steered away from the axis (see FIG. 13). The steering angle $\psi$ in a centrally symmetric refractive field[20] is given by the expression Equation 6

$$\Psi = \pi - 2 \cdot \int_R^\infty \left[ r \sqrt{\left(\frac{nr}{b}\right)^2 - 1} \right]^{-1} \cdot dr$$

where b is the impact factor, r is radial distance from the IR beam axis, n(r) is the refractive index, and R=b/n(R) is the distance of closest approach.

The refractive index n(T) of superheated water is given by IAPWS[21] from 0 to 150° C. This covers the required range except for the beam center. For higher temperatures, the IAPWS data was extrapolated. Using the GE solutions for the thermal field to calculate n(r), the expected probe ray steering by the changed refractive index during the laser pulse as a function of IR laser power and pulse length was derived. The impact factor covers the range 0<b<22 μm due to the large probe beam diameter.

Figure 14:
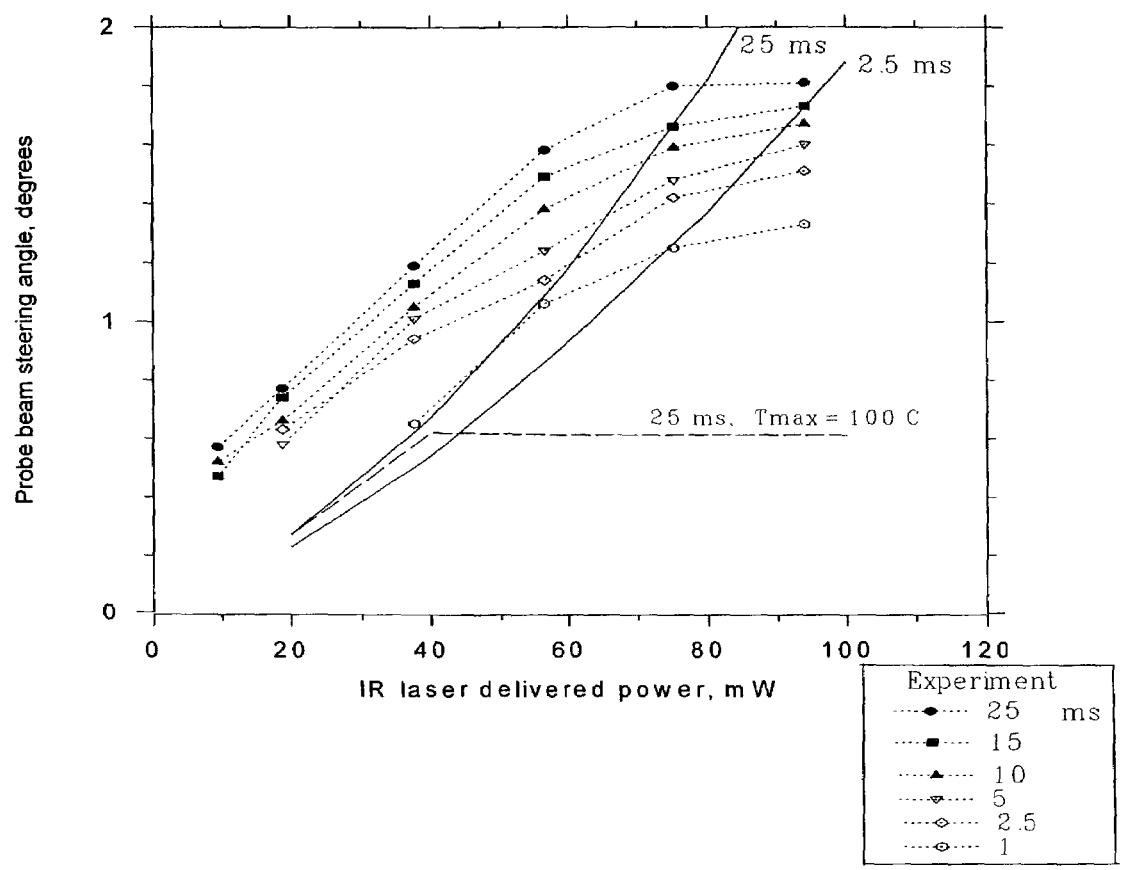
FIG. 14 shows the probe beam steering angle in the IR laser thermal field versus delivered IR power. Measurements are denoted by symbols and predictions by solid lines. The dashed line corresponds to the prediction when maximum temperature cannot exceed 100° C.

The maximum beam bending is a measure of the maximum temperature gradient, which occurs adjacent to the beam radius and corresponds to the specific temperature field. The predicted values for pulse duration 25 and 2.5 ms are shown and maximum measured steering angles are given in FIG. 14 for IR power 20–100 mW and pulse duration 1–25 ms. The laser power shown in FIG. 14 is that delivered at the focal point, allowing for absorption after 200 µm $H_2O$.

After the beam is turned off, any vapor bubbles formed would be expected to collapse in less than 1 ms, releasing heat to the liquid. Possible phase change is neglected in the time scales of interest. Consequently, the predictions derived from Equation (1) to compute temperatures in the beam focal plane can be used.

For higher laser delivered power, the central temperature rises and the thermal gradient becomes steeper. The predicted values therefore increase. The measured values show a tendency to reach a limiting value at high laser powers in the region where the predicted temperature is >200° C., implying that the gradient has maximized. This is unlikely to reflect phase transition: once phase change nucleates at these super-heated temperatures, it would be expected to continue until the medium reaches T=100.

If the medium can reach a maximum temperature of only 100° C. due to phase change, the predicted refractive index gradient never rises high enough to cause the observed beam bending, but flattens out at $\theta=0.6°$. Since the observed maximum ray bending angle is $\theta=1.8°$, the results are consistent with central beam temperature >100° C.

"Melting Point" of Zona Pellucida

Figure 15:
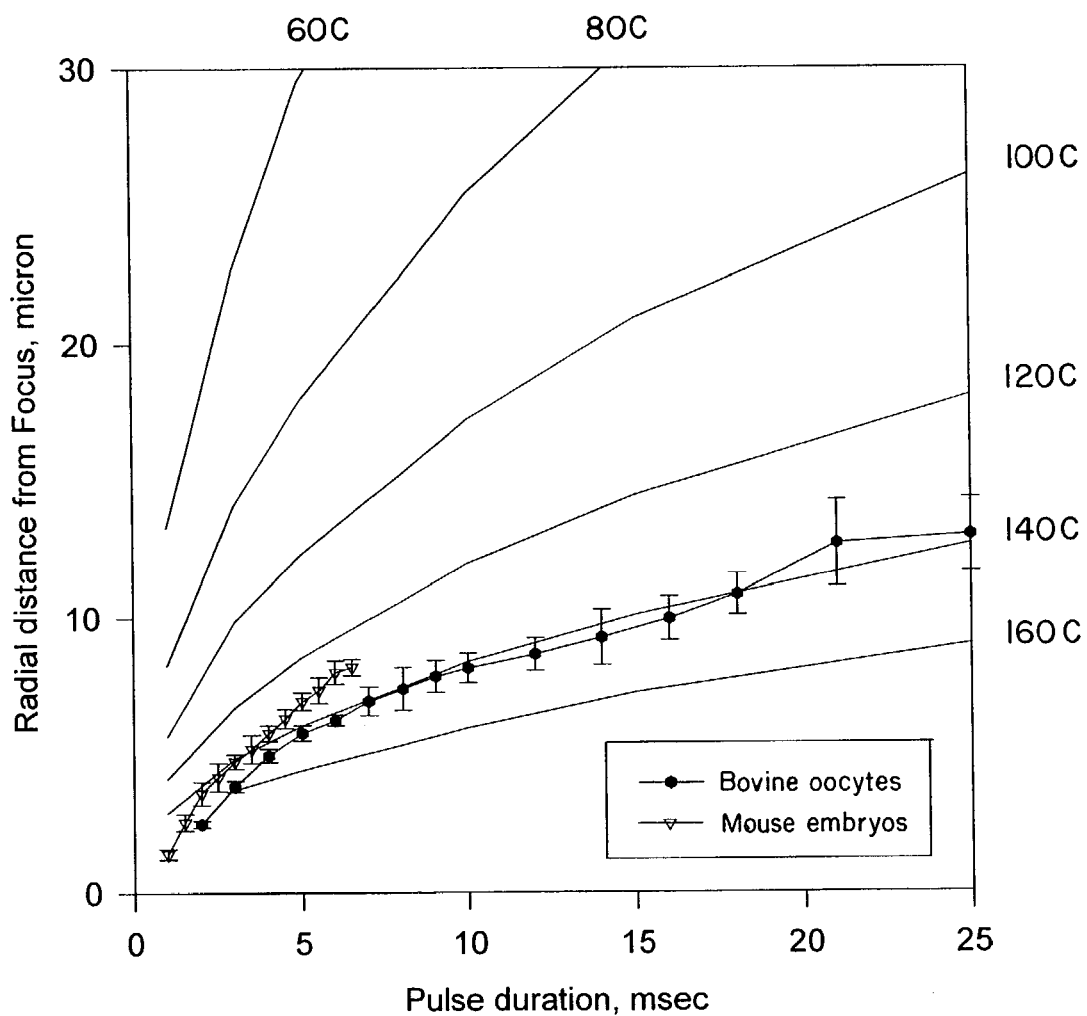
FIG. 15 shows the measured channel diameter versus pulse duration averaged over three bovine eggs and two murine embryos. Predicted maximum temperature in focal plane at given radius is shown versus pulse duration and radial distance from axis.
Figure 16:
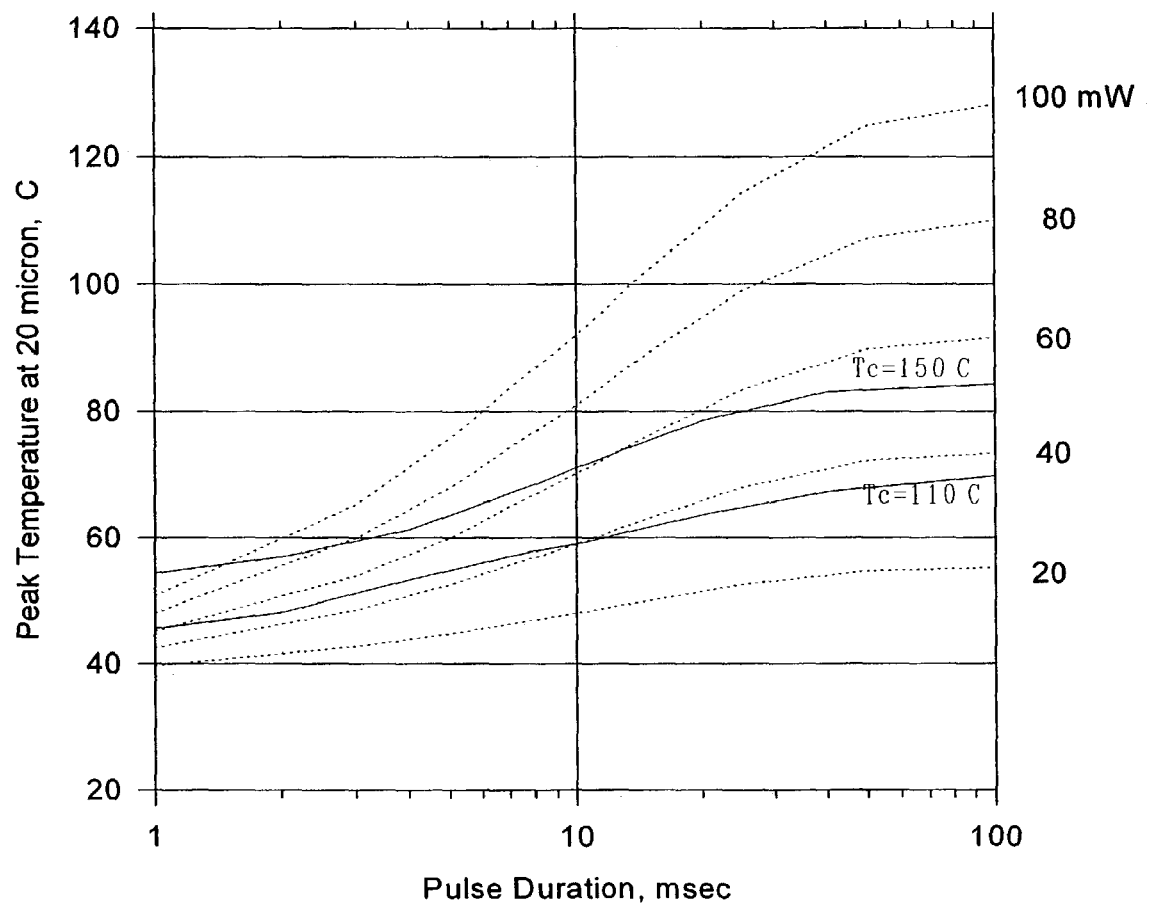
FIG. 16 shows the predicted maximum of the temperature pulse 20 µm from beam axis in the focal plane is given versus laser pulse duration and beam power. Also shown are limit lines corresponding to beam central temperature 150 and 110° C.

The diameter of the channels cut in the ZP of three bovine oocytes have been measured by pulses of power 100 mW and duration 1.5–25 ms, using a 3 µm radius beam under standard conditions. The channels cut in the ZP of murine two-cell pre-embryos have also been measured by the same beam. The channel diameter versus pulse duration is shown for both species in FIG. 15. The GE model is applied to determine temperature history on the focal plane at various distances from the beam axis and the peak temperature calculated at each position is shown in FIG. 15.

The bovine ZP material appears to undergo dissolution (melt) between 140 and 150° C., the temperature decreasing with longer pulse time. The murine ZP appears to be more easily removed and vanishes at about 5–10° C. lower temperature than the bovine.

Descloux and Delacretaz[22] measured the thermal dissolution of mouse ZP at temperatures 61–73° C. over times up to 1000 s, and derived a rate constant. This measurement is extrapolated to estimate the mouse ZP dissolution temperature for 10 ms pulse as 111° C., lower than the experimental estimate averaged over the ZP from mouse pre-embryos. The minimum temperature that must be attained in the beam center in order to ablate human ZP material in the pulse times used is likely to be between 130 and 150° C.

Example 6

Conditions for Minimizing Collateral Damage

It is assumed that the beam central temperature should be maintained at or above about 150° C. in order to penetrate the ZP within pulse time of 10 ms. At the same time, the temperature at the surface of the nearest cell should be minimized. The typical distance to nearest cell is taken as 20 µm and use the thermal model above to derive temperatures on the focal plane at 20 µm from the beam axis: in FIG. 16 a graph is shown of the peak temperature reached during the pulse as function of pulse duration for various beam powers. In the present case, a typical thermal excursion would last on the order of the pulse duration and have peak amplitude shown. The cells, therefore, undergo rapid heating and cooling of amplitude tens of degrees in a few milliseconds.

If thermal damage scales are assumed as a chemical reaction, then damage would be proportional to $\tau \cdot \exp(-\Delta Q/RT)$, where $\tau$ is pulse duration, T is the mean pulse temperature, and $\Delta Q$ is reaction energy. This would imply that the pulse time must be kept extremely short if the temperature rise is significant.

Figure 11:
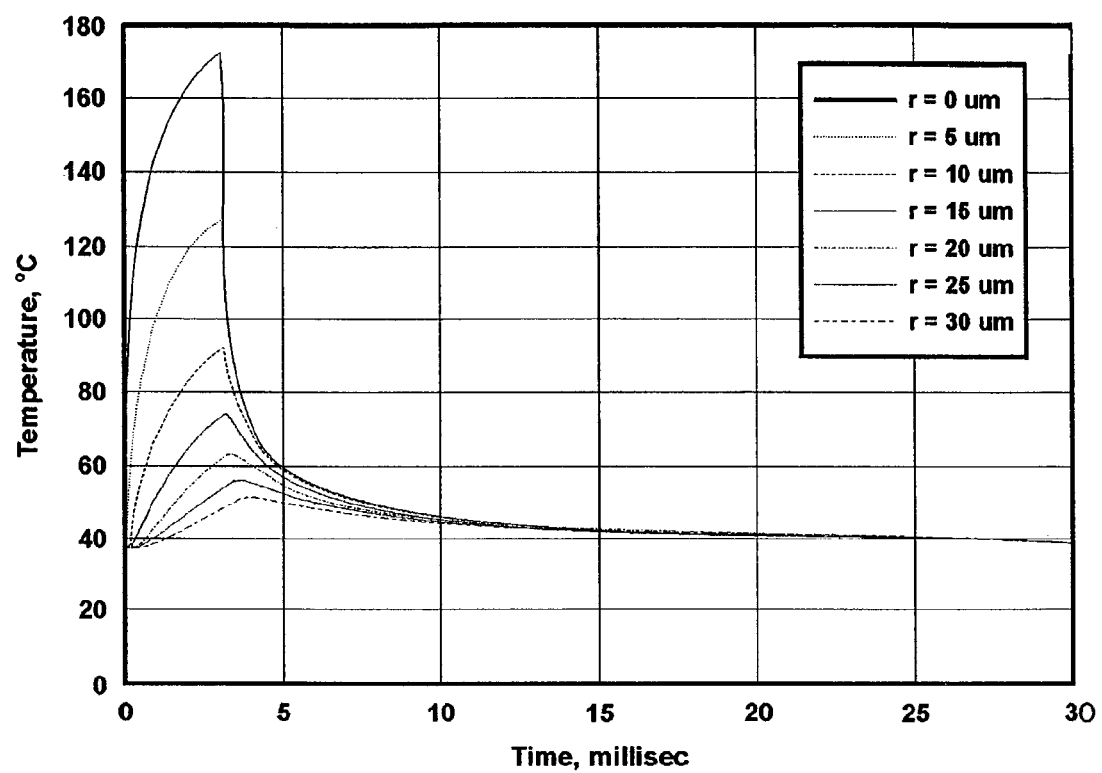
FIG. 11 shows GE analysis of flattop standard case (100 mW, 3 ms, a=3 µm), beam on axis of a 200 µm right cylinder. Temperature given at various radial distances on focal plane. Using a Gaussian-profile beam increases the central temperature peak by about 15° C., but has a negligible effect on the temperature exterior to the beam.

Thermal excursion amplitude and duration should be minimized, therefore, pulse time is low. Short pulse duration and high beam power give the most efficient system for maximizing beam cutting power and minimizing local heating. FIG. 11 indicates limiting lines corresponding to beam center peak temperatures of 150 and 110° C. The peak central temperature should exceed the limiting lines for rapid ZP ablation, while maintaining minimum peak temperature at 20 µm. It is evident that the laser pulse duration should be as short as possible, consistent with effective ZP dissolution, i.e., preferably below 5 ms.

REFERENCES

1. J. Cohen, M. Alikani, J. Trowbricge, and Z. Rosenwaks, "Implantation enhancement by selective assisted hatching using zona drilling of human embryos with poor prognosis," *Hum. Reprod.* 7:685–691 (1992).
2. W. B. Schoolcraft, T. Schlenker, G. S. Jones, and H. W. Jones, "In vitro fertilization in women age 40 and older: The impact of assisted hatching," *J. Assist Reprod Genet.* 12:581–584 (1995).
3. M. Gennons, D. Nocera, A. Senn, K. Rink, G. Delacretaz, Pedrazzini, and J. P. Hornung, "Improved fertilization and implantation rates after non-touch zona pellucida microdrilling of mouse oocytes with a 1.48 µm diode laser beam," *Hum. Reprod* 11:1043–1048 (1996).
4. L. Gianaroli, M. C. Magli, A. P. Ferraretti, A. Fiorentino, J. Garrisi, and S. Munne, "Preimplantation genetic diagnosis increases the implantation rate in human in vitro fertilization by avoiding the transfer of chromosomally abnormal embryos," *Fertil. Steril.* 68:1128–1131 (1997).
5. M. Montag, K. van der Ven, G. Delacretaz, K. Rink, and H. van der Ven, "Laser-assisted microdissection of the zona pellucida facilitates polar body biopsy," *Fertil. Steril.* 69:539–542 (1998).
6. A. Veiga, M. Sandalinas, M. Benkhalifa, M. Boada, M. Can-era, J. Santalo, P. N. Barri, and Y. Menezo, "Laser blastocyst biopsy for preimplantation diagnosis in the human," *Zygote* 5:351–354 (1997).
7. *Handbook of Optics*, W. G. Driscoll, Ed, Optical Society of America, McGraw-Hill, New York (1978).
8. K. Rink, G. Delacretaz, R P. Salathe, A. Senn, D. Nocera, M. Germond, P. de Gamdi, and S. Fakan, "1.48 µm diode laser microdissection of the zona pellucida of mouse oocytes," *Biomedical Optics. International Soc. For Optical Engineering, Proc. SPIE* 2134A-53 (1994).
9. K. Rink, G. Delacretaz, R P. Saiathe, A. Senn, D. Nocera, M. Germond, P. de Gamdi, and S. Fakan, "Non contact microdrilling of mouse zona pellucida with an objective-delivered 1.48 µm diode laser," *Lasers Surg. Med* 18:52–62 (1996).
10. M. Gennons, D. Nocera, A. Senn, K. Rink, G. Delacretaz, and S. Fakan, "Microdissection of mouse and human zona pellucida using a 1.48 µm diode laser beam: efficacy and safety of the procedure," *Fertil. Steril.* 64:604–611 (1995).
11. K. Kanyo, ESHRE Proceedings, Bologna, Italy (2000).
12. M. Gennons, D. Nocera, A. Senn, K. Rink, and G. Delacretaz, "Assisted hatching of frozen-thawed embryos with a 1.48 µm diode laser enhanced pregnancy outcome in patients who had several nidation failures," *Abstract of the Annual Meeting of the American Society for Reproductive Medicine*, P-O51, S116 (1996).
13. Z. P. Nagy, L. Rienzi, M. Iacobelli, F. Morgia, F. Ubaidi, M. Schimberni, and C. Aragona, "Laser assisted hatching and removal of degenerated blastomeres of frozen-thawed embryos improves pregnancy rate," *Fertil. Steril.* 72 (suppl 1) *Abstract of the Annual Meeting of the American Society for Reproductive Medicine*, O-09, S4 (1999).
14. Y. Liu, D. K. Cheng, G. J. Sonek, M. W. Berns, C. F. Chapman, and B. J. Tromberg, "Evidence for localized cell heating induced by infrared optical tweezers," *Biophys. J.* 68:2137–2144 (1995).
15. P. Cellier and J. Conia, "Measurement of localized heating in the focus of an optical trap," *Appl. Opt.* 39:3396–3407 (2000).
16. *Handbook Chem. Phys.*, R Weast, Ed, CRC, Boca Raton (1984).
17. D. Potter, *Computational Physics*, Wiley, New York (1972).
18. S. Koonin, *Computational Physics*, Benjamin Cummings (1986).
19. A. Miotello and R Kelly, "Laser induced phase explosion: New physical problems when a condensed phase approaches the thermodynamic critical temperature," *Appl. Phys. A: Mater. Sci. Process.* 69:S67–S73 (1999).
20. M. Born and E. Wolf, Principles of Optics, 6th ed., Pergamon, New York (1980).
21. R. B. Dooley, "Release on the refractive index of ordinary water substance as a function of wavelength, temperature and pressure," *International Association for the Properties of Water and Steam*, EPRI, Palo Alto, Calif., 94394 (1977).
22. L. Descloux and G. Delacretaz, Inst. Appl. Optics DM2-10AEPFL, Lausanne (1999).

I claim:

1. An optical injection system for use in conjunction with a microscope with a turret for supporting an objective, the optical injection system comprising a unitary assembly comprising:
    an objective having an optical path;
    a dichroic minor disposed between the turret and the objective, along the optical path; and
    a laser assembly comprising a collimating lens and a laser source, the laser source positioned to project a laser beam through the collimating lens so that the laser beam is reflected off the dichroic mirror and is introduced into the optical path and onto a sample at a focal point for laser manipulation of the sample;
    wherein the laser beam has a first diameter within the optical path which converges into the focal point; and
    a piston constructed and arranged to selectively adjust the distance between the objective and the focal point.

2. The optical injection system of claim 1, wherein the focal point has a focal diameter of about 10 µm or less.

3. The system of claim 2, wherein the laser beam comprises a wavelength within the infrared region.

4. The system of claim 2, wherein the laser source comprises an internal laser powered from an electronic package.

5. The system of claim 2, wherein the laser source further comprises fiber optic cable providing optical energy from a laser.

6. The system of claim 2, wherein the laser source is one of an internal laser and/or an external laser.

7. The system of claim 2, wherein the laser source operates at a wavelength ($\lambda$) of about 1480 nm.

8. The system of claim 2, wherein the microscope comprises one of an inverted and a non-inverted microscope.

9. The system of claim 2, wherein the objective comprises a shortened objective to provide a standard 45 mm parfocal unit module.

10. The system of claim 2, wherein the turret mounts on a removable turret adapter, the turret adapter being one of a plurality of turret adapter designs, thereby creating a universal mounting system, which enables the optical injection system to be mounted to the microscope.

11. The system of claim 10, wherein the turret adapter enables a method of orienting the optical injection system in any rotational position on a turret objective port.

12. The system of claim 2, further comprising an electronic package disposed separate from the system.

13. The system of claim 2, further comprising an electronic package built-in to a board in a computing apparatus.

14. The system of claim 13, wherein the laser source is coupled to a fiber and mounted inside the electronic package, and a second end of the fiber is mounted in the optical injection system in place of the laser source.

15. The system of claim 2, wherein the system is suitable for the intended use of ablating, dissecting, moving, holding, or otherwise effecting biological cells or tissues with a laser source.

16. The system of claim 2, wherein the laser beam is confocal with an optical image.

17. The system of claim 2, wherein the laser source and collimating lens further comprise fiber optic cable with integrated collimating lens providing optical energy from a laser.

18. The system of claim 2, comprising a mount for releasably mounting the optical injection system to the turret.

19. The system of claim 1, wherein the piston is constructed and arranged to selectively adjust the distance between the laser source and the collimating lens.

20. An optical injection system for use in conjunction with a microscope with a turret for supporting an objective, the optical injection system comprising a unitary assembly comprising:
    an objective having an optical path;
    a dichroic mirror disposed between the turret and the objective, along the optical path; and
    a laser assembly comprising a collimating lens and a laser source, the laser source positioned to project a laser beam through the collimating lens so that the laser beam is reflected off the dichroic mirror and onto a sample at a focal point;
    wherein the laser beam has a first diameter within the optical path which converges into the focal point and
    a piston constructed and arranged to selectively adjust the distance between the objective and the focal point.

21. The system of claim 20, wherein the laser beam comprises a wavelength within the infrared region.

22. The system of claim 20, wherein the piston is constructed and arranged to selectively adjust the distance between the laser source and the collimating lens.

* * * * *

UNITED STATES PATENT AND TRADEMARK OFFICE
CERTIFICATE OF CORRECTION

PATENT NO. : 7,359,116 B2
APPLICATION NO. : 10/271706
DATED : April 15, 2008
INVENTOR(S) : Thomas G. Kenny It is certified that error appears in the above-identified patent and that said Letters Patent is hereby corrected as shown below:

ON THE TITLE PAGE:

Item (73) Assignee, "Hamilton Thome Biosciences, Inc." should read --Hamilton Thorne Biosciences, Inc.--.

Signed and Sealed this

Fifth Day of August, 2008

JON W. DUDAS
*Director of the United States Patent and Trademark Office*